United States Patent
Hinoshita et al.

(10) Patent No.: US 10,946,286 B2
(45) Date of Patent: Mar. 16, 2021

(54) GAME SYSTEM, GAME PROCESSING METHOD, INFORMATION PROCESSING APPARATUS, AND STORAGE MEDIUM HAVING STORED THEREIN INFORMATION PROCESSING PROGRAM

(71) Applicant: NINTENDO CO., LTD., Kyoto (JP)

(72) Inventors: Wataru Hinoshita, Kyoto (JP); Haruna Sugano, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 484 days.

(21) Appl. No.: 15/822,418

(22) Filed: Nov. 27, 2017

(65) Prior Publication Data
US 2018/0169528 A1    Jun. 21, 2018

(30) Foreign Application Priority Data

Dec. 15, 2016  (JP) .............................. JP2016-243096

(51) Int. Cl.
| | | |
|---|---|---|
| *A63F 13/79* | (2014.01) | |
| *A63F 13/52* | (2014.01) | |
| *A63F 13/95* | (2014.01) | |
| *A63F 13/35* | (2014.01) | |
| *A63F 13/48* | (2014.01) | |
| *A63F 13/795* | (2014.01) | |

(52) U.S. Cl.
CPC .............. *A63F 13/79* (2014.09); *A63F 13/35* (2014.09); *A63F 13/48* (2014.09); *A63F 13/52* (2014.09); *A63F 13/795* (2014.09); *A63F 13/95* (2014.09)

(58) Field of Classification Search
CPC .......... A43F 13/79; A63F 13/35; A63F 13/48; A63F 13/52; A63F 13/795; A63F 13/95
See application file for complete search history.

(56) References Cited

U.S. PATENT DOCUMENTS

| | | | | |
|---|---|---|---|---|
| 9,101,836 B1* | 8/2015 | Brenden | ................. | A63F 13/86 |
| 2003/0211877 A1 | 11/2003 | Yamada | | |
| 2008/0076545 A1* | 3/2008 | Oliveras | ................. | G07F 17/32 |
| | | | | 463/29 |
| 2016/0001181 A1* | 1/2016 | Marr | ...................... | A63F 13/30 |
| | | | | 463/42 |
| 2017/0282082 A1* | 10/2017 | Hubbard | ................ | G06Q 50/00 |

FOREIGN PATENT DOCUMENTS

| | | |
|---|---|---|
| JP | 2003-325981 | 11/2003 |
| JP | 2011-92623 | 5/2011 |
| JP | 2016-002413 | 1/2016 |

* cited by examiner

*Primary Examiner* — William H McCulloch, Jr.
*Assistant Examiner* — Ankit B Doshi
(74) *Attorney, Agent, or Firm* — Nixon & Vanderhye PC

(57) ABSTRACT

A non-limiting example game system includes a plurality of terminal apparatuses operated by a plurality of players, and connect to a network. The computer system creates a virtual lobby that allows up to a predetermined number of players to participate therein, and sets a player who operates one of the terminal apparatuses as a player who is virtually present in the lobby in response to a request from that terminal apparatus. The game system also automatically selects one from a plurality of games including at least games requiring different numbers of participant players, according to the number of players who are present in the lobby and are not playing a game and are ready to play, and automatically selects participant players in the selected game from the players ready to play.

34 Claims, 26 Drawing Sheets

Fig.12

| GAME | NUMBER OF PARTICIPANTS | DESCRIPTION |
|---|---|---|
| GAME G1 | TWO | ONE-ON-ONE FIGHTING GAME |
| GAME G2 | TWO | GAME IN WHICH PLAYER CHARACTERS BEAT ENEMY CHARACTER IN COOPERATION WITH EACH OTHER |
| GAME G3 | THREE | GAME IN WHICH PLAYERS CONTEND FOR POINTS |
| ⋮ | ⋮ | ⋮ |

Fig.23

| PLAYER INFORMATION | STATE INFORMATION | HISTORY INFORMATION |
|---|---|---|
| PLAYER P1 | READY TO PLAY | GAME G1 (P2) |
| PLAYER P2 | READY TO PLAY | GAME G1 (P1) |
| PLAYER P3 | GAME G2 IS BEING PLAYED | — |
| PLAYER P4 | GAME G2 IS BEING PLAYED | — |
| PLAYER P5 | READY TO PLAY | — |

GAME SYSTEM, GAME PROCESSING METHOD, INFORMATION PROCESSING APPARATUS, AND STORAGE MEDIUM HAVING STORED THEREIN INFORMATION PROCESSING PROGRAM

CROSS REFERENCE TO RELATED APPLICATION

The disclosure of Japanese Patent Application No. 2016-243096, filed Dec. 15, 2016, is incorporated herein by reference.

FIELD

The technology disclosed herein relates to game systems, game processing methods, information processing apparatuses, and storage medium having stored therein information processing programs for allowing a plurality of players to play a game.

BACKGROUND AND SUMMARY

There is a conventional game system in which a multi-player game is played using a plurality of terminal apparatuses through communication, and particularly in which a virtual room is created, and players enter the room, in which the players a game together.

In such a conventional game system, players need to wait for a game to start until the number of players who have entered the room reaches the capacity of the room. If the waiting time is long, players may lose interest.

With this in mind, disclosed herein are a game system, game processing method, information processing apparatus, and storage medium storing an information processing program that can match up players in a comfortable manner.

(1) A non-limiting example game system disclosed herein includes a plurality of terminal apparatuses configured to be operated by a plurality of players, and connect to a network. The game system includes a lobby creation section, a lobby entry processing section, a game selection processing section, and a game processing section. The lobby creation section creates a virtual lobby that allows up to a predetermined number of players to participate therein. The lobby entry processing section sets a player who operates one of the terminal apparatuses as a player who is virtually present in the lobby, in response to a request from the one of the terminal apparatuses. The game selection processing section automatically selects one from a plurality of games including at least games requiring different numbers of participant players, according to the number of players who are present in the lobby and are not playing a game and are ready to play, and automatically selects participant players in the selected game from the players ready to play. The game processing section performs a game process for the selected game according to an operation performed by the selected participant players.

According to the feature (1), a game is selected from a plurality of games requiring different numbers of participant players, according to the number of players who are ready to play. As a result, a situation can be reduced in which players need to wait for a game to start until a fixed number of participant players required for the game are ready to play, and the waiting time imposed on players can be reduced.

(2) The game system may further include a post-game processing section. After the end of a game performed in the game processing section, the post-game processing section maintains participant players in the game, present in the lobby, and sets the participant players as a player who is ready to play.

According to the feature (2), it is not necessary for a player to send an instruction to allow the player to enter the lobby again after the end of a game, and therefore, the player's time and effort can be removed.

(3) The game system may further include a lobby image generation section. The lobby image generation section generates a lobby image indicating a state of the lobby, at least when the participant players are ready to play.

According to the feature (3), the lobby image can be used to present a state of the lobby to a player.

(4) The lobby image may contain at least information about the participant players in the selected game that is being played, and information about a state of the selected game.

According to the feature (4), a player who is ready to play can be notified of a state of a game that is being played.

(5) When the selected game is being executed in the game processing section, the lobby image may contain an image in which a game icon indicating the selected game that is being played is associated with player icons indicating the participant players in the selected game that is being played, and a player icon indicating a player ready to play.

According to the feature (5), a terminal apparatus can use the lobby image to present, to a player, a game that is being played in the lobby, participant players in the game, and players who are ready to play in the lobby.

(6) At least one of the terminal apparatuses may be configured to be operated by a plurality of players. The lobby entry processing section, when there is a request from one of the terminal apparatuses that is operated by a plurality of players, may set each of the plurality of players as a player who is virtually present in the lobby. The lobby image generation section may generate an image containing player icons each indicating a corresponding one of a plurality of players operating a single one of the terminal apparatuses, the player icons being associated with each other.

According to the feature (6), a player is allowed to easily recognize a plurality of players who operate a single terminal apparatus.

(7) After the game selection processing section selects a game and participant players, the lobby image generation section may generate an image containing a game icon indicating the selected game, and player icons indicating the selected participant players, the game icon being associated with the player icons.

According to the feature (7), a player is allowed to easily recognize a game that is to be next started, and players who are to participate in the game.

(8) At least one of the terminal apparatuses may be operated by a plurality of players. The lobby entry processing section may set each of the plurality of players as a player who is virtually present in the lobby, in response to a request from one of the terminal apparatuses that is operated by a plurality of players.

According to the feature (8), a game can be easily played in a lobby when a single terminal apparatus is played by a plurality of players.

(9) The game system may further include a history storage section that stores history information about a game that was played by the plurality of players when the plurality of players were present in the lobby. The game selection processing section may select a game based on the history information.

According to the feature (9), a game can be selected based on a history, which allows a player to select a more preferable game.

(10) The game system may further include a determination section. The determination section may determine whether or not the selected game is nearly finished, based on states of the participant players in the selected game and/or an elapsed time from start of the selected game. When the determination section has determined that the selected game is nearly finished, the game selection processing section may not select a new game until end of the selected game that it has been determined is nearly finished, and select a new game after end of the selected game that it has been determined is nearly finished.

According to the feature (10), after the end of a game which it has been determined is nearly finished, a new game is selected, and therefore, more variety can be added to the selection of a game and participant players, and more preferable selection can be thereby performed.

(11) The game system may further include a group information storage section that stores player information that is group information indicating a group of players allowed to play the plurality of games, and indicates each of the players included in the group. The lobby entry processing section may update the player information so that the player information contains information about a player present in the lobby.

According to the feature (11), the group information can be used to manage an entry state of a lobby.

(12) At least one of the plurality of terminal apparatuses may be a master terminal apparatus. The master terminal apparatus may include a game selection processing section and a management terminal setting section. The management terminal setting section may set one of the terminal apparatuses operated by selected participant players, as a game management terminal apparatus, in response to the selection of the game by the game selection processing section. The terminal apparatus set as the game management terminal apparatus may manage data that is used in a game process for the game selected by the game selection processing section.

According to the feature (12), a processing load on a master terminal apparatus that manages a lobby can be reduced.

(13) The master terminal apparatus may include a lobby state sending section that sends information indicating a state of the lobby to a slave terminal apparatus of the plurality of terminal apparatuses, the slave terminal apparatus being different from the master terminal apparatus. The slave terminal apparatus may include a lobby image generation section that generates a lobby image indicating the state of the lobby based on the information sent from the master terminal apparatus.

According to the feature (13), a lobby image based on a state of a lobby managed by a master terminal apparatus can be displayed on a slave terminal apparatus.

It should be noted that a non-limiting example game processing method executed in the game system having the features (1)-(13) are disclosed herein. In addition, disclosed herein are non-limiting example information processing apparatuses (e.g., a terminal apparatus and a server) that have some of the sections of the game system of having the features (1)-(13), and a non-limiting example storage medium storing an information processing program that causes a computer in each information processing apparatus to function as a means equivalent to a corresponding one of the sections of the game system.

According to the game system, the game processing method, the information processing apparatus, and the storage medium storing the information processing program, a waiting time imposed on a player when matching-up is performed for players can be reduced.

These and other objects, features, aspects and advantages of the present non-limiting example embodiment will become more apparent from the following detailed description of the present non-limiting example embodiment when taken in conjunction with the accompanying drawings.

BRIEF DESCRIPTION OF THE DRAWINGS

FIG. 12 is a diagram showing a non-limiting example game group that can be played by a player in a lobby;

FIG. 23 is a diagram showing a non-limiting example piece of lobby information;

DETAILED DESCRIPTION OF NON-LIMITING EXAMPLE EMBODIMENTS

[1. Configuration of Entire System]

Figure 1:
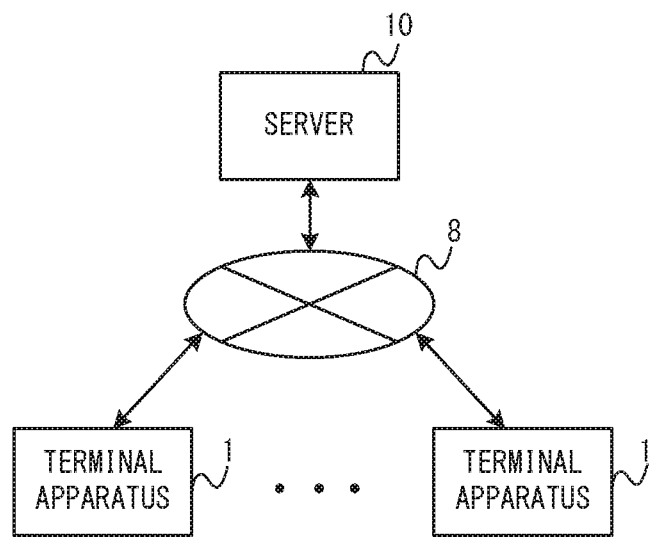
FIG. 1 is a block diagram showing a non-limiting example configuration of a game system according to this non-limiting example embodiment.

A game system, information processing apparatus, information processing program, and game processing method according to this non-limiting example embodiment will now be described. FIG. 1 is a block diagram showing a non-limiting example configuration of a game system according to this non-limiting example embodiment. As shown in FIG. 1, the game system includes a server 10 and a plurality of terminal apparatuses 1. The server 10 and the terminal apparatuses 1 can connect to a network 8, such as the Internet and/or a mobile communication network, etc. The server 10 can communicate with each terminal apparatus 1 through the network 8. Each terminal apparatus 1 can communicate with the other terminal apparatuses 1 and the server 10 through the network 8. Although described in detail below, each terminal apparatus 1 communicates with another terminal apparatus 1 so that the users (i.e., players) of these terminal apparatuses 1 play a multiplayer game. Although FIG. 1 shows only two terminal apparatuses 1, the game system may include three or more terminal apparatuses. Although described in detail below, the number of terminal apparatuses included in the game system varies depending on the state of entry of players into a lobby described below.

(1-1. Specific Example of Configuration of Terminal Apparatus)

The terminal apparatus 1 according to the non-limiting example embodiment is described below with reference to FIGS. 2-9. An example of the terminal apparatus 1 according to the non-limiting example embodiment includes a main body apparatus (an information processing apparatus; which functions as a game apparatus main body in the non-limiting example embodiment) 2, a left controller 3, and a right controller 4. Each of the left controller 3 and the right controller 4 is attachable to and detachable from the main body apparatus 2. That is, the terminal apparatus 1 can be used as a unified apparatus obtained by attaching each of the left controller 3 and the right controller 4 to the main body apparatus 2. Further, in the terminal apparatus 1, the main body apparatus 2, the left controller 3, and the right controller 4 can also be used as separate bodies (see FIG. 3). Further, the terminal apparatus 1 is used in the following forms: an image is displayed on the main body apparatus 2; and an image is displayed on another display apparatus (e.g., a stationary monitor), such as a television or the like. In the former forms, the terminal apparatus 1 can be used as a handheld apparatus (e.g., a handheld game console). Further, in the latter form, the terminal apparatus 1 can be used as a stationary apparatus (e.g., a stationary game console). As described above, the terminal apparatus 1 can be said as an information processing system including a plurality of apparatuses (or a terminal system). It should be noted that this terminal system can include a wireless controller which is not attached to the main body apparatus 2.

Figure 2:
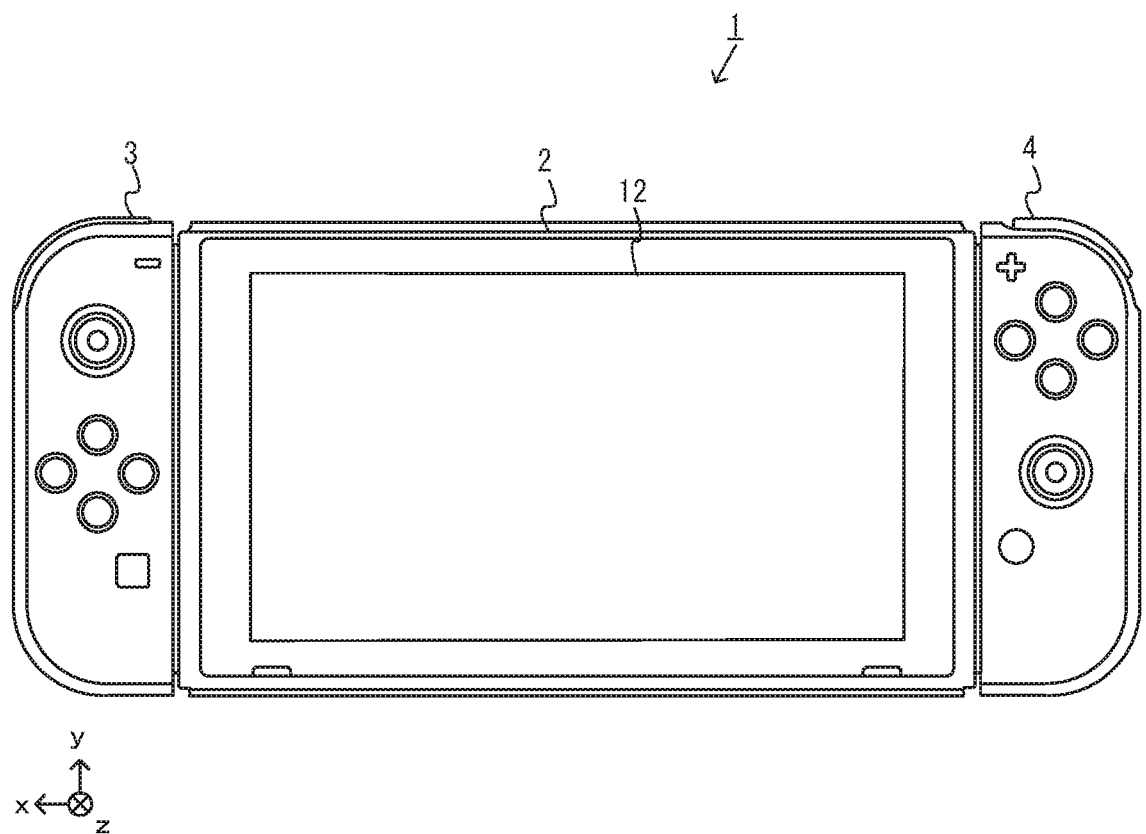
FIG. 2 is a diagram showing a non-limiting example state where a non-limiting example left controller 3 and a non-limiting example right controller 4 are attached to a non-limiting example main body apparatus 2.

FIG. 2 is a diagram showing a non-limiting example state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the terminal apparatus 1. The main body apparatus 2 includes a display 12. Each of the left controller 3 and the right controller 4 is an apparatus including operation sections with which a user provides inputs.

Figure 3:
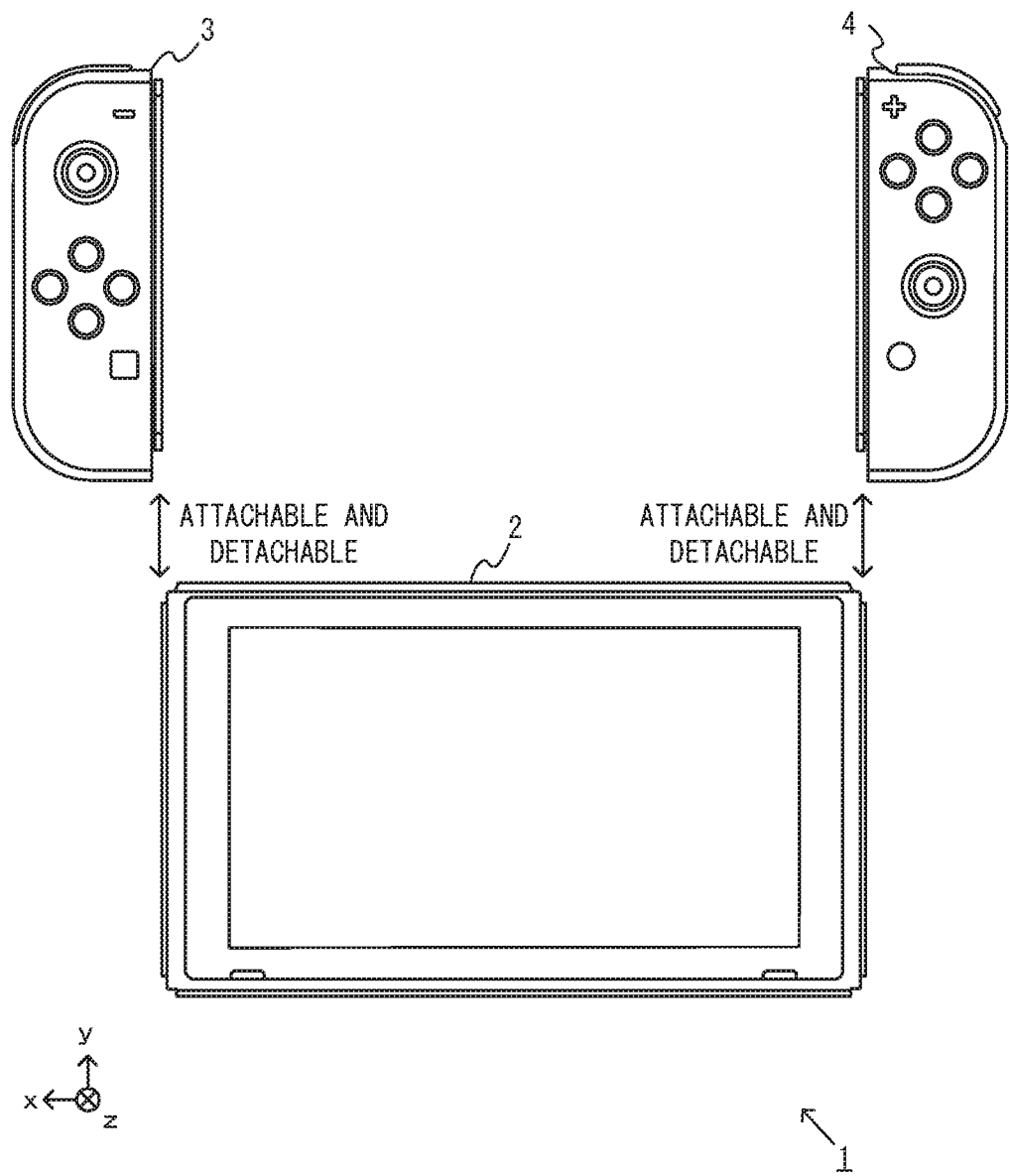
FIG. 3 is a diagram showing a non-limiting example state where each of a non-limiting example left controller 3 and a non-limiting example right controller 4 is detached from a non-limiting example main body apparatus 2.

FIG. 3 is a diagram showing a non-limiting example state where each of the left controller 3 and the right controller 4 is detached from the main body apparatus 2. As shown in FIGS. 2 and 3, the left controller 3 and the right controller 4 are attachable to and detachable from the main body apparatus 2. The left controller 3 can be attached to a left side surface (a side surface in the positive direction of the x-axis shown in FIG. 2) of the main body apparatus 2. The left controller 3 is attachable to and detachable from the main body apparatus 2 by being slid along the left side surface of the main body apparatus 2 in the y-axis direction shown in FIG. 2. Further, the right controller 4 can be attached to a right side surface (a side surface in the negative direction of the x-axis shown in FIG. 2) of the main body apparatus 2. The right controller 4 is attachable to and detachable from the main body apparatus 2 by being slid along the right side surface of the main body apparatus 2 in the y-axis direction shown in FIG. 2. It should be noted that hereinafter, the left controller 3 and the right controller 4 are hereinafter occasionally collectively referred to as "controllers."

Figure 4:
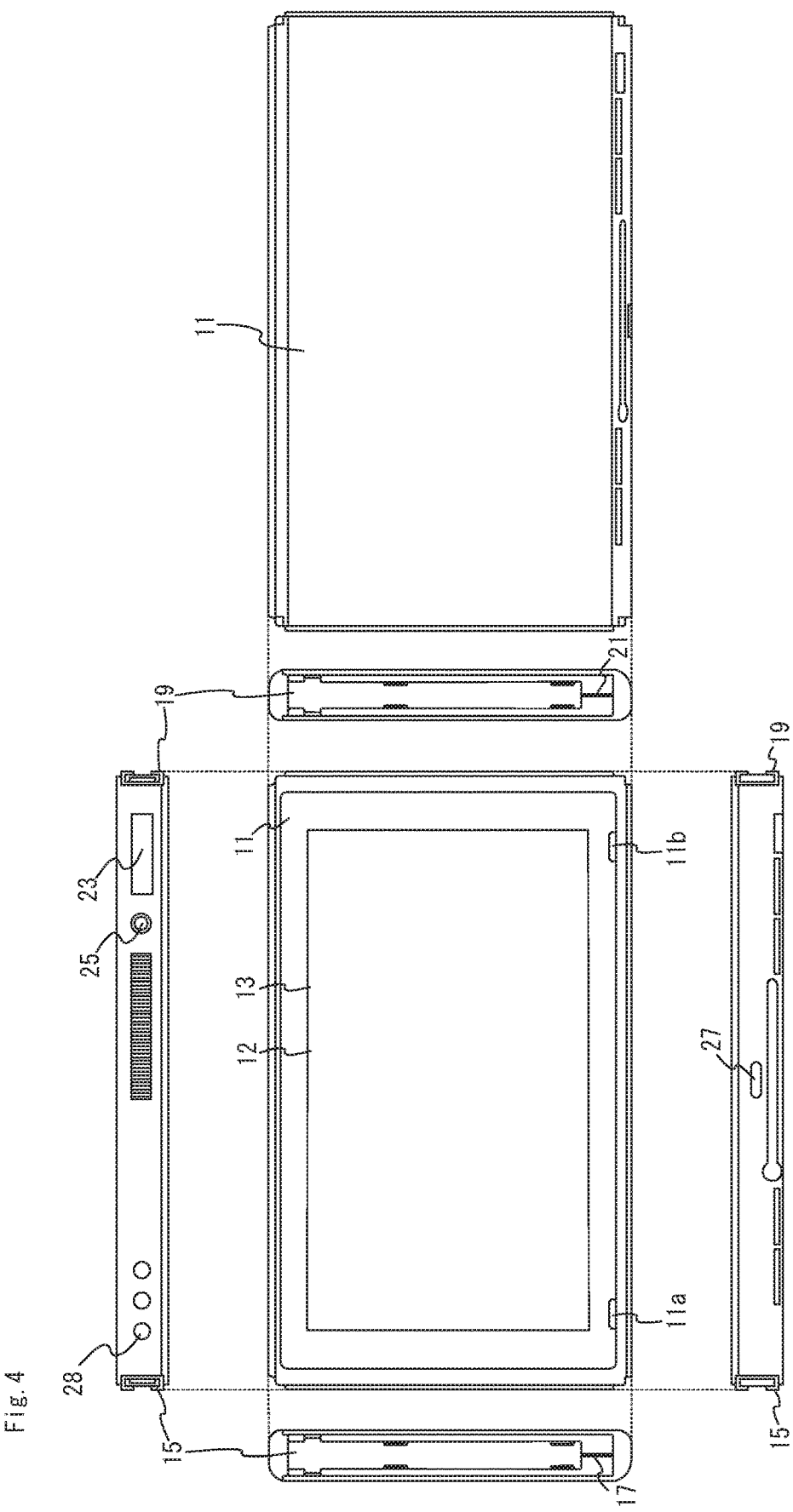
FIG. 4 is a diagram having six orthogonal views showing a non-limiting example main body apparatus 2.

FIG. 4 is a diagram having six orthogonal views showing a non-limiting example of the main body apparatus 2. As shown in FIG. 4, the main body apparatus 2 includes an approximately plate-shaped housing 11. In the non-limiting example embodiment, a main surface (or a surface on a front side, i.e., a surface on which the display 12 is provided) of the housing 11 has a generally rectangular shape.

It should be noted that the housing 11 may have any suitable shape and size. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 4, the main body apparatus 2 includes the display 12, which is provided on the main surface of the housing 11. The display 12 displays an image generated by the main body apparatus 2. In the non-limiting example embodiment, the display 12 is a liquid crystal display device (LCD). The display 12, however, may be a display device of any type.

Further, the main body apparatus 2 includes a touch panel 13 on a screen of the display 12. In the non-limiting example embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 7) within the housing 11. As shown in FIG. 4, speaker holes 11*a* and 11*b* are formed on the main surface of the housing 11. Then, sounds output from the speakers 88 are output through the speaker holes 11*a* and 11*b*.

As shown in FIG. 4, the main body apparatus 2 includes a left rail member 15 on the left side surface of the housing 11. The left rail member 15 is a member for detachably attaching the left controller 3 to the main body apparatus 2. The left rail member 15 is provided on the left side surface of the housing 11, extending in the vertical direction (the y-axis direction). The left rail member 15 is so shaped as to engage with a slider (i.e., a slider 40 shown in FIG. 5) of the left controller 3. The left rail member 15 and the slider 40 form a slider mechanism. The slider mechanism allows the left controller 3 to be slid and detachably attached to the main body apparatus 2. Further, a right rail member 19 is provided on the right side surface of the housing 11, which has a configuration similar to that of the left rail member 15.

Further, the main body apparatus 2 includes a left terminal 17. The left terminal 17 is a terminal for allowing the main body apparatus 2 to perform wired communication with the left controller 3. The left terminal 17 is provided at a position where the left terminal 17 is made contact with a terminal (a terminal 42 shown in FIG. 5) of the left controller 3 when the left controller 3 is attached to the main body apparatus 2. Further, the main body apparatus 2 includes a right terminal 21. The right terminal 21 is a terminal for allowing the main body apparatus 2 to perform wired communication with the right controller 4. The right terminal 21 is provided at a position where the right terminal 21 is made contact with a terminal (a terminal 64 shown in FIG. 6) of the right controller 4 when the right controller 4 is attached to the main body apparatus 2.

As shown in FIG. 4, the main body apparatus 2 includes a first slot 23. The first slot 23 is provided on an upper side surface of the housing 11. The first slot 23 is so shaped as to allow a first type of storage medium to be inserted in the first slot 23. The first type of storage medium is, for example, a dedicated storage medium (e.g., a dedicated memory card) to the terminal apparatus 1 and an information processing apparatus of the same type as the terminal apparatus 1. The first type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28. As shown in FIG. 4, the power button 28 is provided on the upper side surface of the housing 11. The power button 28 is a button for turning the main body apparatus 2 on/off.

The main body apparatus 2 includes an audio input/output terminal (specifically, an earphone jack) 25. That is, a microphone or an earphone can be attached to the audio input/output terminal 25 of the main body apparatus 2. As shown in FIG. 4, the audio input/output terminal 25 is provided on the upper side surface of the housing 11.

The main body apparatus 2 includes a lower terminal 27. The lower terminal 27 is a terminal for allowing the main body apparatus 2 to communicate with a cradle. As shown in FIG. 4, the lower terminal 27 is provided on a lower side surface of the housing 11. When the main body apparatus 2 is mounted on the cradle, the lower terminal 27 is connected to a terminal of the cradle. In this example, the lower terminal 27 is a USB connector (more specifically, a female connector). Only the main body apparatus 2 from which the left controller 3 and the right controller 4 are detached can be mounted on the cradle. Further, in still another example, a unified apparatus obtained by attaching the left controller 3 and the right controller 4 to the main body apparatus 2 can be mounted on the cradle. Further, the cradle can communicate with a stationary monitor which is a non-limiting example of an external display apparatus (e.g., a stationary television) that is separated from the main body apparatus 2 (through wired communication or wireless communication). When the unified apparatus or the main body apparatus 2 alone is mounted on the cradle, the terminal apparatus 1 can display, on the stationary monitor, an image generated by and output from the main body apparatus 2. Further, in this example, the cradle has the function of charging the unified apparatus or the main body apparatus 2 alone mounted on the cradle. Further, the cradle also serves as a hub device (specifically, a USB hub).

Each of the above components (specifically, buttons, slots, terminals, etc.) provided in or on the housing 11 has any suitable shape, number, and arrangement. For example, in another example, some of the power button 28 and the slot 23 may be provided on another side surface or a back surface of the housing 11. Further, in another example, the main body apparatus 2 may not include some of the above components.

Figure 5:
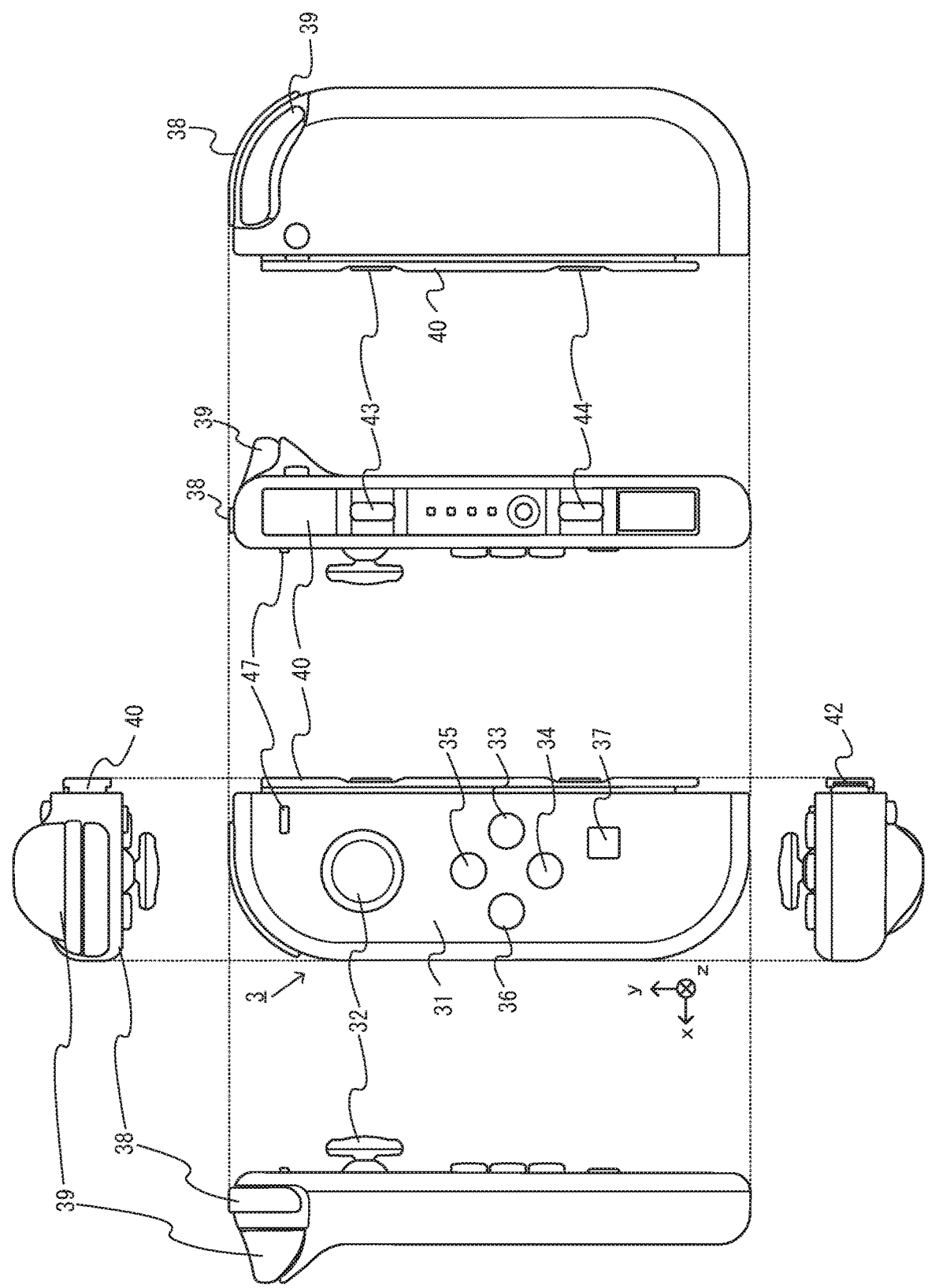
FIG. 5 is a diagram having six orthogonal views showing a non-limiting example left controller 3.

FIG. 5 is a diagram having six orthogonal views showing a non-limiting example of the left controller 3. As shown in FIG. 5, the left controller 3 includes a housing 31. In this example, the housing 31 is an approximately plate-shaped housing. Further, a main surface (or a surface on a front side, i.e., a surface in the negative direction of the z-axis shown in FIG. 2) has a generally rectangular shape. Further, in this example, the housing 31 is longer than it is wide, i.e., is shaped to be long in a vertical direction (i.e., the y-axis direction shown in FIG. 2). In the state where the left controller 3 is detached from the main body apparatus 2, the left controller 3 can also be held in the orientation in which the left controller 3 is vertically long, i.e., in its portrait orientation. The housing 31 has such a shape and a size that when held in its portrait orientation, the housing 31 can be held by one hand, particularly the left hand. Further, the left controller 3 can also be held in the orientation in which the left controller 3 is horizontally long, i.e., in its landscape orientation. When held in its landscape orientation, the left controller 3 may be held by both hands. It should be noted that the housing 31 may have any suitable shape. In another example, the housing 31 may not be an approximately plate-shaped housing. Further, the housing 31 may not have a rectangular shape. The housing 31 may have a semicircular shape or the like, for example. Further, the housing 31 may not be longer than it is wide.

A vertical length of the housing 31 is substantially the same as that of the housing 11 of the main body apparatus 2. Further, a thickness (i.e., a length in the fore-and-aft direction, or a length in the z-axis direction shown in FIG. 2) of the housing 31 is substantially the same as that of the housing 11 of the main body apparatus 2. Therefore, when the left controller 3 is attached to the main body apparatus 2 (see FIG. 2), the user can hold the main body apparatus 2 and the left controller 3, feeling as if the user held a single apparatus.

The left controller 3 includes an analog stick 32. As shown in FIG. 5, the analog stick 32 is provided on a main surface of the housing 31. The analog stick 32 can be used as a direction input section with which a direction can be input. The analog stick 32 has a stick member that can be tilted in all directions parallel to the main surface of the housing 31 (i.e., 360 degrees around the center, including vertical directions, horizontal directions, and diagonal directions). The user tilts the stick member and thereby can input a direction corresponding to the direction of the tilt (and can input a magnitude corresponding to the angle of the tilt). It should be noted that the left controller 3 may include a directional pad, a slide stick that allows a slide input, or the like as the direction input section, instead of the analog stick. Further, in this example, it is possible to provide an input by pressing down the stick member (in a direction perpendicular to the housing 31). That is, the analog stick 32 is an input section that can be used to provide: an input having a direction and a magnitude corresponding to the tilt direction and the tilt amount, respectively, of the stick member; and an input by the stick member being pressed down.

The left controller 3 includes four operation buttons 33 to 36 (specifically, a "right" button 33, a "down" button 34, an "up" button 35, and a "left" button 36). As shown in FIG. 5, the four operation buttons 33 to 36 are provided on the main surface of the housing 31 below the analog stick 32. The operation buttons 33 to 36 are used to give instructions related to various programs (e.g., an OS program and application programs) executed by the main body apparatus 2. Further, the left controller 3 has a record button 37. Further, the left controller 3 has a "−" (minus) button 47.

When the left controller 3 is attached to the main body apparatus 2, each operation section (specifically, the analog stick 32 and the buttons 33 to 37 and 47) provided on the main surface of the left controller 3 is operated using the thumb of the left hand of the user holding the unified apparatus, for example. Further, when the left controller 3 as detached from the main body apparatus 2 is being held by both hands in its horizontal orientation, the operation sections are operated using the thumbs of both hands of the user holding the left controller 3, for example. Specifically, in this case, the analog stick 32 is operated using the thumb of the left hand of the user, and the operation buttons 33 to 36 are operated using the thumb of the right hand of the user.

The left controller 3 includes a first L-button 38. Further, the left controller 3 includes a ZL-button 39. These operation buttons 38 and 39 are used to give instructions related to various programs executed by the main body apparatus 2, as with the operation buttons 33 to 36. As shown in FIG. 5, the first L-button 38 is provided on an upper left portion of the side surface of the housing 31. Further, the ZL-button 39 is provided on an upper left part (strictly speaking, an upper left portion of the housing 31 as viewed from the front side) extending from the side surface to the back surface of the housing 31. In other words, the ZL-button 39 is provided behind the first L-button 38 (in the positive direction of the z-axis shown in FIG. 2). When the left controller 3 is attached to the main body apparatus 2, the first L-button 38 and the ZL-button 39 are provided on an upper left portion of the unified apparatus.

The left controller 3 includes the slider 40. As shown in FIG. 5, the slider 40 is provided on the right side surface of the housing 31, extending vertically. The slider 40 is so shaped as to engage with the left rail member 15 (more specifically, a groove of the left rail member 15) of the main body apparatus 2.

Further, the left controller 3 includes the terminal 42 for allowing the left controller 3 to perform wired communication with the main body apparatus 2. The terminal 42 is provided at a position where, when the left controller 3 is attached to the main body apparatus 2, the left controller 3 is made contact with the left terminal 17 (FIG. 4) of the main body apparatus 2.

Further, the left controller 3 includes a second L-button 43 and a second R-button 44. These buttons 43 and 44 are used to give instructions related to various programs executed by the main body apparatus 2, as with the operation buttons 33 to 36. As shown in FIG. 5, the second L-button 43 and the second R-button 44 are provided on the surface to which the slider 40 is to be attached.

Figure 6:
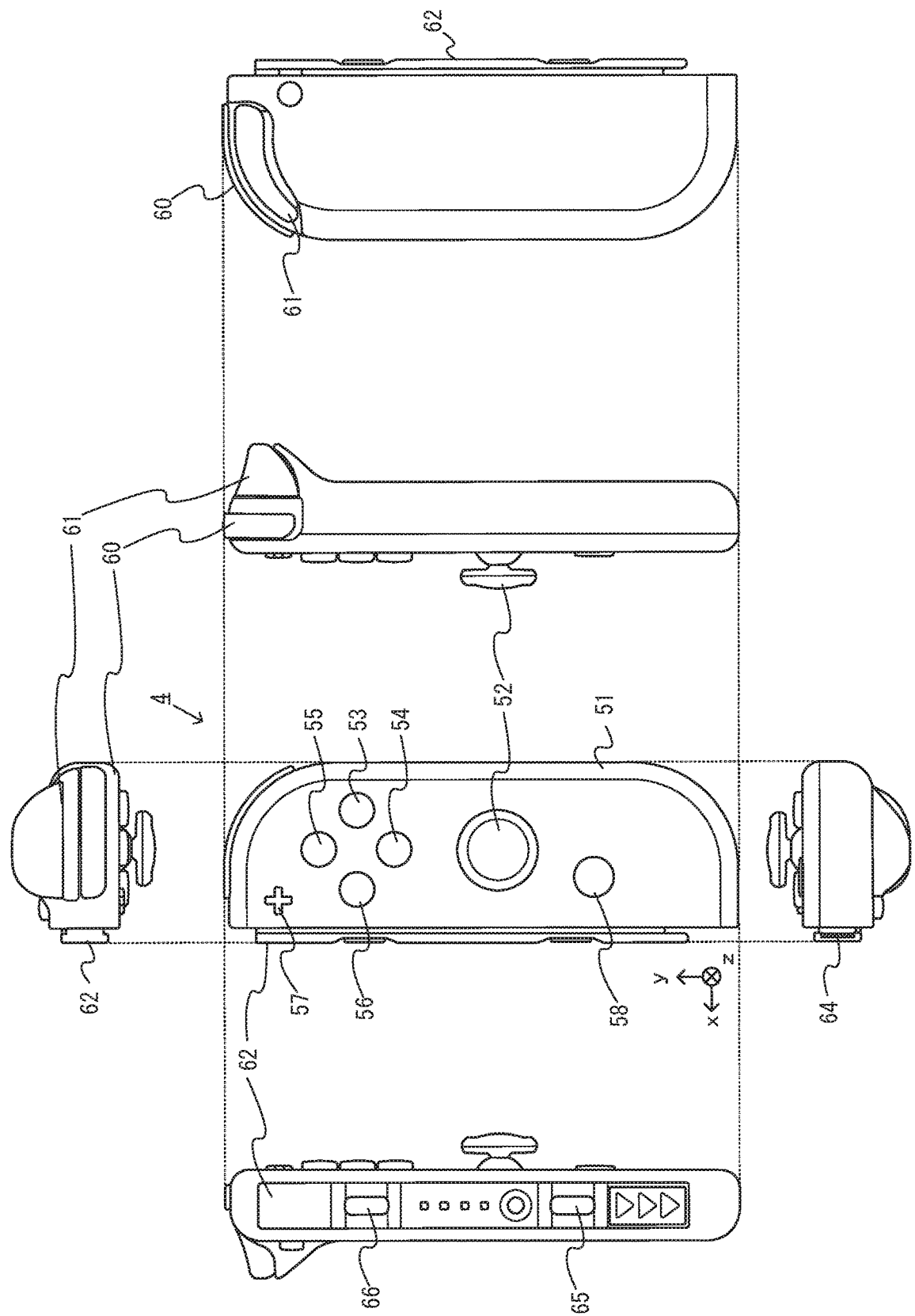
FIG. 6 is a diagram having six orthogonal views showing a non-limiting example right controller 4.

FIG. 6 is a diagram having six orthogonal views showing a non-limiting example of the right controller 4. As shown in FIG. 6, the right controller 4 includes a housing 51. In this example, the housing 51 is an approximately plate-shaped housing. Further, a main surface (or a surface on a front side, i.e., a surface in the negative direction of the z-axis shown in FIG. 2) of the housing 51 has a generally rectangular shape. Further, in this example, the housing 51 is longer than it is wide, i.e., is shaped to be long in a vertical direction (i.e., the y-axis direction shown in FIG. 2). In the state where the right controller 4 is detached from the main body apparatus 2, the right controller 4 can also be held in the orientation in which the left controller 3 is vertically long, i.e., in its portrait orientation. The housing 51 has such a shape and a size that when held in its portrait orientation, the housing 51 can be held by one hand, particularly the right hand. Further, the right controller 4 can also be held in the orientation in which the right controller 4 is horizontally long, i.e., in its landscape orientation. When held in its landscape orientation, the right controller 4 may be held by both hands.

A vertical length of the housing 51 is substantially the same as that of the housing 11 of the main body apparatus 2, like the housing 31 of the left controller 3. Further, a thickness of the housing 51 is substantially the same as that of the housing 11 of the main body apparatus 2. Therefore, when the right controller 4 is attached to the main body apparatus 2 (see FIG. 2), the user can hold the main body apparatus 2 and the right controller 4, feeling as if the user held a single apparatus.

As with the left controller 3, the right controller 4 includes an analog stick 52 as a direction input section. In this example, the analog stick 52 has the same configuration as that of the analog stick 32 of the left controller 3. Further, the right controller 4 may include a directional pad, a slide stick that allows a slide input, or the like, instead of the analog stick. Further, as with the left controller 3, the right controller 4 includes four operation buttons 53 to 56 (specifically, an A-button 53, a B-button 54, an X-button 55, and a Y-button 56). Further, the right controller 4 includes a "+" (plus) button 57 and a home button 58.

When the right controller 4 is attached to the main body apparatus 2, each operation section (specifically, the analog stick 52 and the buttons 53 to 58) provided on the main surface of the right controller 4 is operated using the thumb of the right hand of the user holding the unified apparatus, for example. Further, when the right controller 4 as detached from the main body apparatus 2 is being held by both hands in its horizontal orientation, the operation sections are operated using the thumbs of both hands of the user holding the right controller 4, for example. Specifically, in this case, the analog stick 52 is operated using the thumb of the left hand of the user, and the operation buttons 53 to 56 are operated using the thumb of the right hand of the user.

The right controller 4 includes a first R-button 60. Further, the right controller 4 includes a ZR-button 61. As shown in FIG. 6, the first R-button 60 is provided on an upper right portion of the side surface of the housing 51. Further, the ZR-button 61 is provided on an upper right part (strictly speaking, an upper right portion of the housing 51 as viewed from the front side) extending from the side surface to the back surface of the housing 51. In other words, the ZR-button 61 is provided behind the first R-button 60 (in the positive direction of the z-axis shown in FIG. 2).

The right controller 4 includes a slider mechanism similar to the left controller 3. That is, the right controller 4 includes a slider 62.

Further, the right controller 4 includes a terminal 64 for allowing the right controller 4 to perform wired communication with the main body apparatus 2. The terminal 64 is provided at a position where, when the right controller 4 is attached to the main body apparatus 2, the right controller 4 is made contact with the right terminal 21 (FIG. 4) of the main body apparatus 2.

Further, the right controller 4 includes a second L-button 65 and a second R-button 66, as with the left controller 3. These buttons 65 and 66 are used to give instructions related to various programs executed by the main body apparatus 2, as with the operation buttons 53 to 56.

It should be noted that, in the left controller 3 and the right controller 4, each of the components (specifically, sliders, sticks, buttons, etc.) provided in or on the housing 11 or 51 has any suitable shape, number, and arrangement. For example, in another example, the left controller 3 and the right controller 4 may include a direction input section that is different from an analog stick. Further, the slider 40 or 62 may be provided at a position corresponding to the position of the rail member 15 or 19 provided on the main body apparatus 2, e.g., the main surface or the back surface of the housing 31 or 51. Further, in another example, the left controller 3 and the right controller 4 may not have some of the above components.

Figure 7:
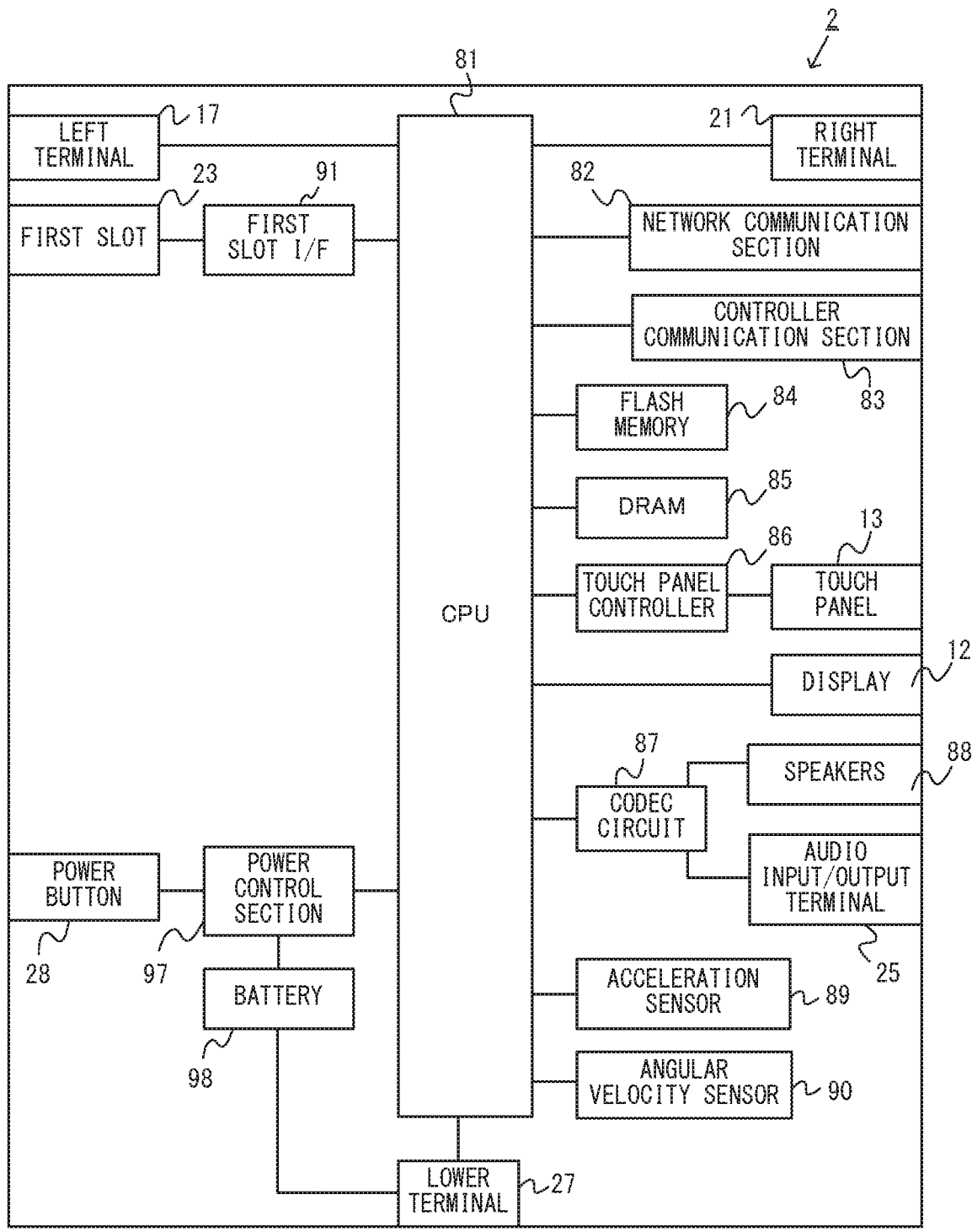
FIG. 7 is a block diagram showing an internal configuration of a non-limiting example main body apparatus 2.

FIG. 7 is a block diagram showing a non-limiting example of the internal configuration of the main body apparatus 2. The main body apparatus 2 includes components 81 to 98 shown in FIG. 7 in addition to the components shown in FIG. 4. Some of the components 81 to 98 may be implemented as electronic parts on an electronic circuit board, which is accommodated in the housing 11.

The main body apparatus 2 includes a central processing unit (CPU) 81. The CPU 81 is an information processing section for executing various types of information processing to be executed by the main body apparatus 2. Strictly speaking, the CPU 81 may be a system-on-a-chip (SoC) having a plurality of functions such as a CPU function, a graphics processing unit (GPU) function, and the like. The CPU 81 executes an information processing program (e.g., a game program) stored in a storage section (specifically, an internal storage medium such as a flash memory 84, an external storage medium attached to each slot 23, or the like), thereby performing the various types of information processing.

The main body apparatus 2 includes a flash memory 84 and a dynamic random access memory (DRAM) 85 as examples of internal storage media built into the main body apparatus 2. The flash memory 84 and the DRAM 85 are coupled to the CPU 81. The flash memory 84 is a memory mainly used to store various data (or programs) to be saved in the main body apparatus 2. The DRAM 85 is a memory used to temporarily store various data used for information processing.

The main body apparatus 2 includes a first slot interface (hereinafter abbreviated to "IF") 91. The slot I/F 91 is coupled to the CPU 81. The slot I/F 91 is coupled to the slot 23, and in accordance with instructions from the CPU 81, reads and writes data from and to the first type of storage medium (e.g., an SD card) attached to the slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is coupled to the CPU 81. The network communication section 82 communicates (specifically, through wireless communication) with an external apparatus via a network. In this example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 located in a closed local network area, and the plurality of main body apparatuses 2 directly communicate with each other to transmit and receive data.

The main body apparatus 2 includes a controller communication section 83. The controller communication section 83 is coupled to the CPU 81. The controller communication section 83 wirelessly communicates with the left controller 3 and/or the right controller 4. The main body apparatus 2 may communicate with the left controller 3 and the right controller 4 using any suitable communication method. In this example, the controller communication section 83 performs communication compliant with the Bluetooth (registered trademark) standard with the left controller 3 and with the right controller 4.

The CPU 81 is coupled to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle, the CPU 81 transmits data to the cradle via the lower terminal 27. As described above, in this example, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a user or users can simultaneously provide inputs to the main body apparatus 2 using a plurality of left controllers 3 and a plurality of right controllers 4.

The main body apparatus 2 includes a touch panel controller 86 which is a circuit for controlling the touch panel 13. The touch panel controller 86 is coupled between the touch panel 13 and the CPU 81. Based on a signal from the touch panel 13, the touch panel controller 86 generates, for example, data indicating a position where a touch input has been performed. The touch panel controller 86 outputs the data to the CPU 81.

Further, the display 12 is coupled to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is coupled to the speakers 88 and a audio input/output terminal 25 and also coupled to the processor 81. The codec circuit 87 is a circuit for controlling the input and output of sound data to and from the speakers 88 and the audio input/output terminal 25.

Further, the main body apparatus 2 includes an acceleration sensor 89. In this example, the acceleration sensor 89 detects the magnitudes of accelerations along predetermined three axial (e.g., x-, y-, and z-axes shown in FIG. 1) directions. It should be noted that the acceleration sensor 89 may detect an acceleration along one axial direction or accelerations along two axial directions.

Further, the main body apparatus 2 includes an angular velocity sensor 90. In this example, the angular velocity sensor 90 detects angular velocities about predetermined three axes (e.g., the x-, y-, and z-axes shown in FIG. 2). It should be noted that the angular velocity sensor 90 may detect an angular velocity about one axis or angular velocities about two axes.

The acceleration sensor 89 and the angular velocity sensor 90 are coupled to the CPU 81, and the detection results of the acceleration sensor 89 and the angular velocity sensor 90 are output to the processor 81. Based on the detection results of the acceleration sensor 89 and the angular velocity sensor 90, the CPU 81 can calculate information regarding the motion and/or the orientation of the main body apparatus 2. It should be noted that, in this non-limiting example embodiment, an acceleration sensor and an angular velocity sensor are used as inertial sensors for calculating a motion, an orientation, and/or a position of the main body apparatus 2. In another non-limiting example embodiment, other sensors may be used.

The main body apparatus 2 includes a power control section 97 and a battery 98. The power control section 97 is coupled to the battery 98 and the CPU 81. Further, although not shown, the power control section 97 is coupled to components of the main body apparatus 2 (specifically, components that receive power supplied from the battery 98, the left terminal 17, and the right terminal 21). Based on a command from the CPU 81, the power control section 97 controls the supply of power from the battery 98 to the above components. Further, the power control section 97 is coupled to the power button 28. The power control section 97 controls the supply of power to each section based on an input to the power button 28. That is, when an operation of turning off is performed on the power button 28, the power control section 97 stops supplying power to all or a portion of the above sections. When an operation of turning on is performed on the power button 28, the power control section 97 starts supplying power all or a portion of the above sections. Further, the power control section 97 outputs information indicating an input to the power button 28 (specifically, information indicating whether or not the power button 28 has been pressed down) to the CPU 81.

Further, the battery 98 is coupled to the lower terminal 27. When an external charging device (e.g., the cradle) is connected to the lower terminal 27, and power is supplied to the main body apparatus 2 via the lower terminal 27, the battery 98 is charged with the supplied power.

Figure 8:
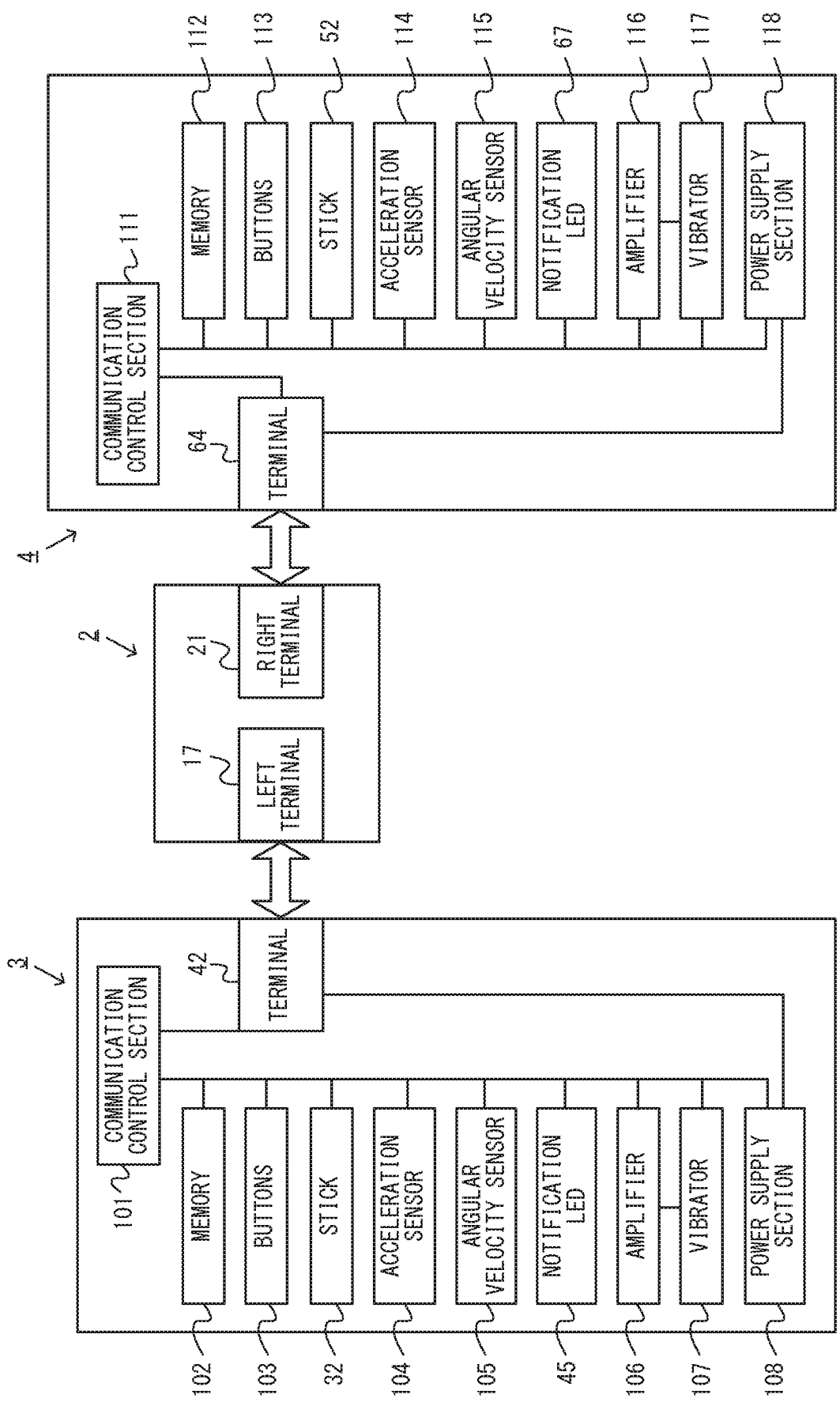
FIG. 8 is a block diagram showing internal configurations of a non-limiting example main body apparatus 2, a non-limiting example left controller 3, and a non-limiting example right controller 4.

FIG. 8 is a block diagram showing non-limiting example internal configurations of the main body apparatus 2, the left controller 3, and the right controller 4. It should be noted that the details of the internal configuration of the main body apparatus 2 are shown in FIG. 7 and therefore are not shown in FIG. 8.

The left controller 3 includes a communication control section 101 which communicates with the main body apparatus 2. As shown in FIG. 8, the communication control section 101 is coupled to components including the terminal 42. In this example, the communication control section 101 can communicate with the main body apparatus 2 through both wired communication via the terminal 42 and wireless communication without using the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 8) 32. Each of the buttons 103 and the analog stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In this example, the acceleration sensor 104 detects the magnitudes of accelerations along predetermined three axial (e.g., x-, y-, and z-axes shown in FIG. 5) directions. It should be noted that the acceleration sensor 104 may detect an acceleration along one axial direction or accelerations along two axial directions. In this example, the angular velocity sensor 105 detects angular velocities about predetermined three axes (e.g., the x-, y-, and z-axes shown in FIG. 5). It should be noted that the angular velocity sensor 105 may detect an angular velocity about one axis or angular velocities about two axes. Each of the acceleration sensor 104 and the angular velocity sensor 105 is coupled to the communication control section 101. Then, the detection results of the acceleration sensor 104 and the angular velocity sensor 105 are output to the communication control section 101 repeatedly at appropriate timings.

The communication control section 101 acquires information regarding an input (specifically, information regarding an operation or the detection result of a sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations performed on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In this example, the vibrator 107 is controlled in accordance with a command from the main body apparatus 2. That is, the communication control section 101, when receiving the above command from the main body apparatus 2, drives the vibrator 107 in accordance with the received command. Here, the left controller 3 includes an amplifier 106. The communication control section 101, when receiving the above command, outputs a control signal corresponding to the command to the amplifier 106. The amplifier 106 amplifies the control signal from the communication control section 101 to generate a driving signal for driving the vibrator 107, and outputs the drive signal to the vibrator 107. Thus, the vibrator 107 is operated.

The left controller 3 includes a power supply section 108. In this example, the power supply section 108 includes a battery and a power control circuit. Although not shown, the power control circuit is coupled to the battery and also coupled to components of the left controller 3 (specifically, components that receive power supplied from the battery). The power control circuit controls the supply of power from the battery to each of the above sections. Further, the battery is coupled to the terminal 42. In this example, when the left controller 3 is attached to the main body apparatus 2, the battery is charged with power supplied from the main body apparatus 2 via the terminal 42, under predetermined conditions.

As shown in FIG. 8, the right controller 4 includes a communication control section 111 which communicates with the main body apparatus 2. Further, the right controller 4 includes a memory 112 which is coupled to the communication control section 111. The communication control section 111 is coupled to components including the terminal 64. The communication control section 111 and the memory 112 have functions similar to those of the communication control section 101 and the memory 102, respectively, of the left controller 3. Thus, the communication control section 111 can communicate with the main body apparatus 2 through either wired communication via the terminal 64 or wireless communication without using the terminal 64 (specifically, communication compliant with the Bluetooth (registered trademark) standard). The communication control section 111 controls a communication method that is performed by the right controller 4 with respect to the main body apparatus 2.

The right controller 4 includes input sections similar to those of the left controller 3. Specifically, the right controller 4 includes buttons 113, an analog stick 52, and inertial sensors (an acceleration sensor 114 and an angular velocity sensor 115). These input sections have functions similar to those of the input sections of the left controller 3 and operate in manners similar to those of the input sections of the left controller 3.

Further, the right controller 4 includes a vibrator 117 and an amplifier 116. The vibrator 117 and the amplifier 116 operate in manners similar to those of the vibrator 107 and the amplifier 106 of the left controller 3. That is, the communication control section 111 operates the vibrator 117 using the amplifier 116 in accordance with a command from the main body apparatus 2.

The right controller 4 includes a power supply section 118. The power supply section 118 has a function similar to that of the power supply section 108 of the left controller 3, and operates in a similar manner. That is, the power supply section 118 controls the supply of power from the battery to each of sections that need power. Further, when the right controller 4 is attached to the main body apparatus 2, the battery is charged with power supplied from the main body apparatus 2 via the terminal 64, under predetermined conditions.

The terminal apparatus 1 of this non-limiting example embodiment can be used by a single user, or multiple users simultaneously. Specifically, no matter whether or not the controllers are attached to the main body apparatus 2, the user can hold and operate one or both of the two controllers 3 and 4. Furthermore, when the two controllers 3 and 4 are detached from the main body apparatus 2, multiple users can simultaneously use the terminal apparatus 1, as described below.

Figure 9:
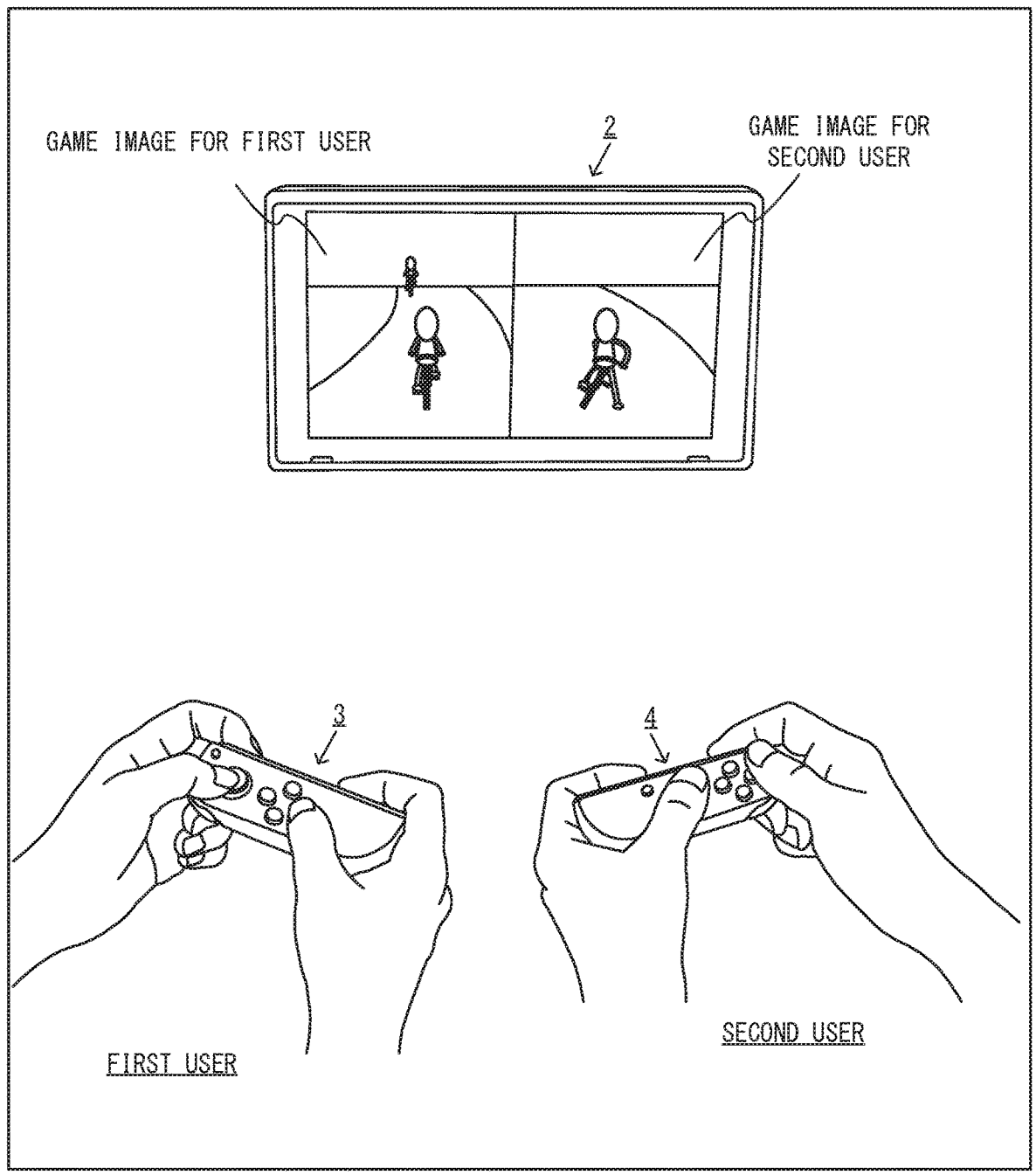
FIG. 9 is a diagram showing a non-limiting example situation in which a game is played using a non-limiting example left controller 3 and a non-limiting example right controller 4 as detached from a non-limiting example main body apparatus 2.

FIG. 9 is a diagram showing a non-limiting example situation in which a game is played using the left controller 3 and the right controller 4 as detached from the main body apparatus 2. As shown in FIG. 9, when the controllers 3 and 4 are detached from the main body apparatus 2, a first user of the two users can operate the left controller 3 while a second user can operate the right controller 4. As a result, the two users can simultaneously use the terminal apparatus 1, i.e., a multiplayer game can be performed using a single terminal apparatus 1. Furthermore, when the terminal system includes a controller or controllers that can wirelessly communicate with the terminal apparatus 1 in addition to the two controllers 3 and 4, three or more users can simultaneously use the terminal apparatus 1.

It should be noted that, in the case of a multiplayer game, the screen area of the display 12 (or an external display device separated from the main body apparatus 2) of the main body apparatus 2 may or may not be divided into subscreen areas. When the screen area of the display 12 is divided into subscreen areas, the display 12 may display a game image for a first user and a game image for a second user, as shown in FIG. 9, for example.

(1-2. Specific Non-limiting Example Configuration of Server)

Figure 10:
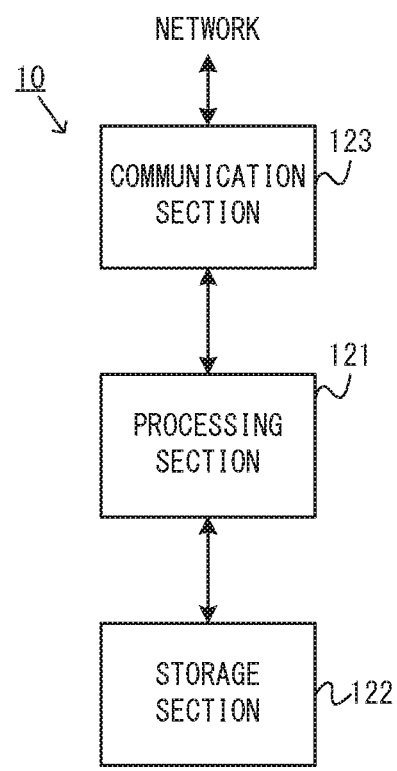
FIG. 10 is a block diagram showing a configuration of a non-limiting example server 10.

FIG. 10 is a block diagram showing a non-limiting example configuration of the server 10. Each component included in the server 10 shown in FIG. 10 is implemented by one or more information processing apparatuses. As used herein, the term "server" refers to a single information processing apparatus (i.e., a server apparatus), or alternatively, an entire server apparatus group (i.e., a server system) when the server function is implemented by a plurality of server apparatuses. In other words, a "server" may be either a server apparatus or a server system. It should be noted that the hardware configuration of the server 10 of this non-limiting example embodiment may be similar to that of a conventional server.

As shown in FIG. 10, the server 10 includes a processing section 121 and a storage section 122. The processing section 121 is electronically coupled to the sections 122 and 123 of the server 10. The processing section 121 has a CPU and a memory. In the server 10, various information processes are executed by the CPU executing programs stored in the storage section 122 using the memory. The storage section 122 is any suitable storage device (also referred to as a "storage medium") that can be accessed by the processing section 121. The storage section 122 stores programs that are executed by the processing section 121, data that is used in information processes performed by the processing section 121, and data obtained by the information processes, etc. In this non-limiting example embodiment, the storage section 122 stores at least a program for an information process that is executed by the server to perform lobby matching-up described below.

The server 10 includes a communication section 123. The communication section 123 has a function of connecting to the network 8, and communicating with other apparatuses (e.g., the terminal apparatuses 1) through the network 8. In addition to the components shown in FIG. 10, the server 10 may include an input section and a display section as input/output interface.

In this non-limiting example embodiment, the server 10 serves as a "game matching server" that matches a player (i.e., the user of a terminal apparatus 1) up with another player (i.e., the user of another terminal apparatus 1) so that these players can play a multiplayer game using the respective terminal apparatuses. Specifically, the server 10 executes a process of setting a virtual lobby for a game, and a process of causing a player to virtually enter the lobby thus set, in response to a request from a terminal apparatus 1. As used herein, the term "lobby" refers to a virtual place that is provided to players that play a multiplayer game. Players that are present in a single lobby play a multiplayer game.

Although described in detail below, in this non-limiting example embodiment, not only played is a single game from a single lobby, but also different games may be played by different groups of players from a single lobby. That is, in this non-limiting example embodiment, matching-up is initially performed to determine a lobby that players are to enter (i.e., lobby matching-up), and then, matching-up is performed to match up players who are to play a game in the lobby (i.e., game matching-up). The game matching-up determines a game that is to be played by players in a lobby, and some of the players in the lobby who are to participate in the game.

[2. Overview of Process in Game System]

(2-1. Processes Involved in Setting Lobby and Entry into Lobby)

Figure 11:
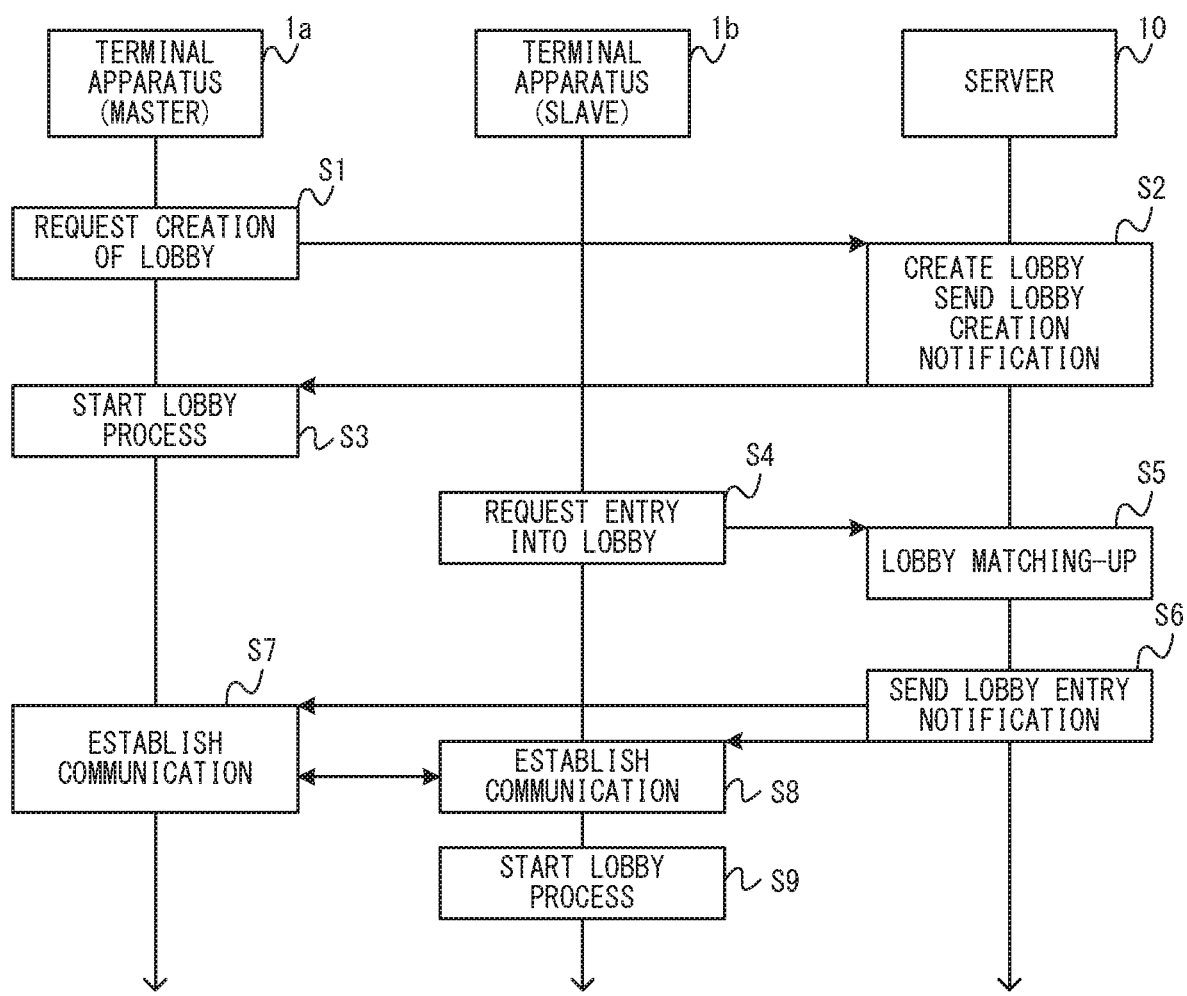
FIG. 11 is a diagram showing non-limiting example flows of a process of setting a lobby and a process of causing players to enter the set lobby.

FIG. 11 is a diagram showing non-limiting example flows of a process of setting a lobby and a process of causing players to enter the set lobby. In this non-limiting example embodiment, as shown in FIG. 11, the server 10 executes setting (also referred to as "creation") of a lobby, and lobby matching-up (i.e., determination of players who are to enter a lobby).

In this non-limiting example embodiment, a new lobby is created in response to a request from a terminal apparatus. Specifically, in FIG. 11, a terminal apparatus 1a sends a request for creation of a lobby (also referred to as a "lobby creation request") to the server 10 according to the player's instruction, for example (step S1). The lobby creation request contains player identification information for identifying the player of the terminal apparatus 1a (e.g., the player's ID or account name) In this non-limiting example embodiment, a lobby creation request can be performed when a predetermined game program is executed in a terminal apparatus 1 (this is also true for a lobby entry request described below). That is, in this non-limiting example embodiment, functions performed by predetermined game program executable in the terminal apparatus 1 include a function of sending a lobby creation request and a function of sending a lobby entry request described below. It should be noted that, in another non-limiting example embodiment, a lobby creation request and a lobby entry request may be sent at any suitable timings.

The server 10 newly creates a lobby in response to the lobby creation request from the terminal apparatus 1a (step S2). In this non-limiting example embodiment, the server 10 stores lobby setting information for managing a lobby in the storage section 122. The lobby setting information can be said as group information indicating a group of players who are allowed to enter a lobby (in other words, a group of players who are allowed to play a plurality of games). Specifically, the lobby setting information contains player information (e.g., player identification information) about each player included in a group. The lobby setting information also contains identification information of a created lobby.

When receiving a lobby creation request, the server 10 newly stores lobby setting information in which identification information of a newly created lobby, and the player identification information of the player of the terminal apparatus 1a as the sender of the lobby creation request, are associated with each other. Thus, the server 10 updates the lobby setting information so that the lobby setting information contains player information indicating players who are present in a lobby. This allows for management of the entry state of a lobby using the lobby setting information.

In step S2, the server 10, when creating a lobby, sends a lobby creation notification to the terminal apparatus 1a. The terminal apparatus 1a, when receiving the lobby creation notification, starts executing an information process (hereinafter referred to as a "lobby process," see FIG. 24) in the set lobby (step S3). The player of the terminal apparatus 1a can newly set a lobby by steps S1-S3.

When the player of a terminal apparatus 1b that is different from the terminal apparatus 1a desires to enter the lobby set by steps S1-S3, the terminal apparatus 1b sends a lobby entry request to the server 10 according to the player's instruction, for example (step S4). The lobby entry request contains the player identification information of the player of the terminal apparatus 1b.

The server 10 determines a lobby that the player of the terminal apparatus 1b is to enter in response to the lobby entry request from the terminal apparatus 1b (i.e., lobby matching-up) (step S5). In this case, the server 10 updates the lobby setting information of the determined lobby that the player of the terminal apparatus 1b is to enter so that the lobby setting information contains the player identification information of the player of the terminal apparatus 1b. Therefore, lobby setting information is updated to contain player information indicating a player who is present in a lobby. This allows the server 10 to manage the entry state of a lobby using lobby setting information. It should be noted that, in this non-limiting example embodiment, a state in which a player is present in a lobby includes a state in which the player is not playing a game in the lobby, and a state in which the player is playing a game from the lobby (in other words, a state in which the player is playing a game with which the player is matched up in the lobby).

It should be noted that any suitable method for matching a player up with a lobby may be used. A lobby that a player is to enter may be determined according to any suitable rule or algorithm. A conventional method for matching a player up with a lobby may be used.

Further, in this non-limiting example embodiment, as described above, two players can simultaneously use a single terminal apparatus 1. Therefore, the server 10 allows two players using a single terminal apparatus 1 to be simultaneously present in a lobby. Specifically, when two players enter a lobby, their terminal apparatus 1 sends a lobby creation request or lobby entry request containing the player identification information of the two players to the server 10 in step S1 or S4 When sending the lobby creation request or lobby entry request, the terminal apparatus 1 may determine whether to send a request for entry of one of the two players into a lobby or a request for entry of both of the two players into a lobby, according to a player's instruction, for example.

When receiving the lobby creation request or lobby entry request containing the player identification information of the two players, the server 10 causes the two players related to the request to enter a lobby. That is, the server 10 stores lobby setting information containing the player identification information of the two players contained in the request. Although described in detail below, two players who are present in a single lobby and use a single terminal apparatus, are dealt with as a "pair of players." In this non-limiting example embodiment, lobby setting information contains information indicating whether or not a player is one of a pair of players.

It should be noted that the server 10, when receiving a lobby entry request related to a pair of players, may perform lobby matching-up such that the pair of players sending the lobby entry request is more likely to enter (or inevitably enter) a lobby in which another pair of players is already present. This allows a pair of players to be more likely to enter a lobby in which another pair of players is already present, and therefore, it is more likely that pairs of players play a game together from a lobby.

As described above, in this non-limiting example embodiment, the server 10 causes each of a plurality of (here, two) players to enter a virtual lobby in response to a request from a terminal apparatus operated by the players. Therefore, according to this non-limiting example embodiment, for example, two players who have been playing a game that has nothing to do with a lobby (e.g., an offline game, etc.) using a single terminal apparatus can directly play a game from a lobby. Thus, in this non-limiting example embodiment, when a plurality of players play a game using a single terminal apparatus, the players can more easily play a game from a lobby, which can motivate the players to play a game from a lobby.

If, in step S5, the server 10 has determined a lobby that the player of the terminal apparatus 1b is to enter, the server 10 sends a lobby entry notification indicating that a new player has entered the lobby, to each terminal apparatus (step S6). The lobby entry notifications are sent to the terminal apparatus of a player who is already present in the lobby (here, the terminal apparatus 1a), and the terminal apparatus of a player who has newly entered the lobby (here, the terminal apparatus 1b). The lobby entry notification sent to the terminal apparatus 1a of the player who is already present in the lobby contains information about the player who has newly entered the lobby (e.g., player identification information), and connection information for allowing for communication with the terminal apparatus of the player who has newly entered the lobby (e.g., address information of the terminal apparatus). Meanwhile, the lobby entry notification sent to the terminal apparatus 1b of the player who has newly entered the lobby contains information about the player who is already present in the lobby (e.g., player identification information), and connection information for allowing for communication with the terminal apparatus of the player who is already present in the lobby (e.g., address information of the terminal apparatus).

The terminal apparatus 1a (i.e., the terminal apparatus of the player who is already present in the lobby), when receiving the lobby entry notification from the server 10, performs a process of establishing communication with the terminal apparatus 1b of the new player (step S7). Meanwhile, the terminal apparatus 1b (i.e., the terminal apparatus of the player who has newly entered the lobby), when receiving the lobby entry notification from the server 10, performs a process of establishing communication with the terminal apparatus 1a of the player who is already present in the lobby (step S8). It should be noted that the process of establishing communication with another terminal apparatus in steps S7 and S8 is performed using the connection information contained in the lobby entry notification. When communication with another terminal apparatus has been established, the terminal apparatus 1b starts a lobby process (see FIG. 25) (step S9).

Steps S7 and S8 allow the terminal apparatus 1a and the terminal apparatus 1b to communicate with each other. In this non-limiting example embodiment, in a lobby process executed subsequently, peer-to-peer (P2P) communication is performed between terminal apparatuses.

FIG. 11 shows a process that is performed when the player of the second terminal apparatus (1b) enters a lobby that has been created in response to a request from the first terminal apparatus (1a). It should be noted that a process that is performed when the players of the third and following terminal apparatuses enter the lobby is similar to steps S4-S8. In this case, a new player is caused to enter a lobby by steps S4-S8 being executed during execution of a lobby process in a terminal apparatus of a player who is already present in the lobby.

In this non-limiting example embodiment, the server 10 limits the number of players who can enter a lobby. In this non-limiting example embodiment, the server 10 performs lobby matching-up such that a predetermined upper limit (here, eight) (also referred to as a "lobby entry capacity") is put on the number of the terminal apparatuses of players who are present in a lobby. That is, lobby matching-up is performed such that a new player does not enter a lobby in which the number of the terminal apparatuses of players who are already in the lobby has reached the lobby entry capacity. Although described in detail below, in this non-limiting example embodiment, two players can enter a lobby using a single terminal apparatus. Therefore, the maximum number of players who can enter a lobby is 16. Thus, in this non-limiting example embodiment, the server 10 puts a limit on the number of the terminal apparatuses of players who are present in a lobby. Alternatively, in another non-limiting example embodiment, the server 10 may put a limit on the number of players who are present in a lobby.

Further, any suitable method may be used to cause a player who is present in a lobby to exit the lobby. For example, the terminal apparatus 1 of a player who exits a lobby sends a request for an exit from the lobby (also referred to as a "lobby exit request") containing the player identification information of the player to the server 10. The server 10, when receiving the lobby exit request, updates the lobby setting information so as to remove the player identification information of the player who exits the lobby. The server 10 also sends a lobby exit notification containing the player identification information of the player who exits the lobby to the terminal apparatus of each player who is present in the lobby. It should be noted that the terminal apparatus 1 of a player who exits a lobby may send a lobby exit request to another terminal apparatus (e.g., a master terminal apparatus described below). In this case, the other terminal apparatus sends a lobby exit request containing the player identification information of the player who exits the lobby to the server 10.

It should be noted that, in this non-limiting example embodiment, any suitable methods may be used to create a lobby, and cause a player to enter or exit a lobby. Any other methods different from the above methods may be used (conventional methods may be used). For example, in another non-limiting example embodiment, a terminal apparatus may send a lobby entry request containing a condition related to a lobby that a player desires to enter to the server 10. In this case, a lobby that satisfies the condition may be determined as a lobby that the player is to enter (e.g., see "(4-1. Non-limiting Example Variation of Setting of Lobby)" described below). Further, for example, in another non-limiting example embodiment, processes related to creation of a lobby, management of entry into and exit from a lobby, and lobby matching-up may be performed by a terminal apparatus instead of the server 10 (see, for example, FIG. 26).

(2-2. Game that Can be Played from Lobby)

FIG. 12 is a diagram showing a non-limiting example game group that can be played by a player in a lobby (or a game group that can be played from a lobby). As shown in FIG. 12, in this non-limiting example embodiment, a plurality of games are prepared that can be played by a player in a lobby. It should be noted that, in this non-limiting example embodiment, the prepared games are each a multiplayer game. In the non-limiting example of FIG. 12, a game G1 is a fighting game in which the number of participant players is two (e.g., a game in which player characters fight against each other). A game G2 is a game in which the number of participant players is two, and players fight against an enemy in corporation with each other (e.g., a game in which player characters fight against an enemy character in corporation with each other). A game G3 is a game in which the number of participant players is three, and players contend for points (e.g., a mini-game in which players shoot a target to get points). Thus, in this non-limiting example embodiment, a plurality of games (or a game group) having different numbers of participant players are prepared as a game that can be played from a lobby. Although described in detail below, in this non-limiting example embodiment, a game is selected from the game group, and players who are to participate in the game are selected from those in a lobby.

It should be noted that FIG. 12 shows a game in which the number of participant players is two or three. Alternatively, a game group that can be played by players in a lobby may include a game in which the number of participant players is four or more. Further, the game group may include a game that ranges in the number of participant players (e.g., a game that ranges in the number of participant players from two to four). It should be noted that the number of participant players in each game included in the game group is set to a value smaller than the number of players who are allowed to enter a lobby. The game group includes any suitable types (or categories) of games. The game group may include different types of games, or only games of the same type.

In this non-limiting example embodiment, among game programs stored in a storage section (e.g., the flash memory 84 or a storage medium inserted in the first slot 23) accessible by a terminal apparatus, are programs for executing game processes for the game group (and a game process for a single-player game described below). When a game included in the game group is performed, a terminal apparatus 1 executes this program.

(2-3. Determination of Game Played from Lobby)

Next, a game played from a lobby, and a process of selecting (or determining) a player who is to participate in the game (referred to as a "game selection process"), will be described. In this non-limiting example embodiment, one of the terminal apparatuses of players who are present in a lobby is set as a master terminal apparatus. In this non-limiting example embodiment, the master terminal apparatus executes the game selection process. It should be noted that any suitable method may be used to set a master terminal apparatus. In this non-limiting example embodiment, it is assumed that a terminal apparatus that has performed the above lobby creation request (e.g., the terminal apparatus 1*a* shown in FIG. 11) is set as a master terminal apparatus. That is, a terminal apparatus that has performed the lobby creation request, subsequently serves as a master terminal apparatus and executes a lobby process.

It should be noted that when the player of a master terminal apparatus exits a lobby, one of the terminal apparatuses (referred to as "slave terminal apparatuses") other than the master terminal apparatus is set as a new master terminal apparatus. Any suitable method may be used to set a new master terminal apparatus. For example, a new master terminal apparatus may be set based on the order in which the players of terminal apparatuses have entered a lobby.

A non-limiting specific example in which the game selection process is executed for a predetermined lobby will now be described with reference to FIGS. 13-17. FIGS. 13-17 are a diagram showing non-limiting example states of players present in a lobby. A player present in a lobby may be either playing a game or ready to play a game, i.e., not playing a game.

Figure 13:
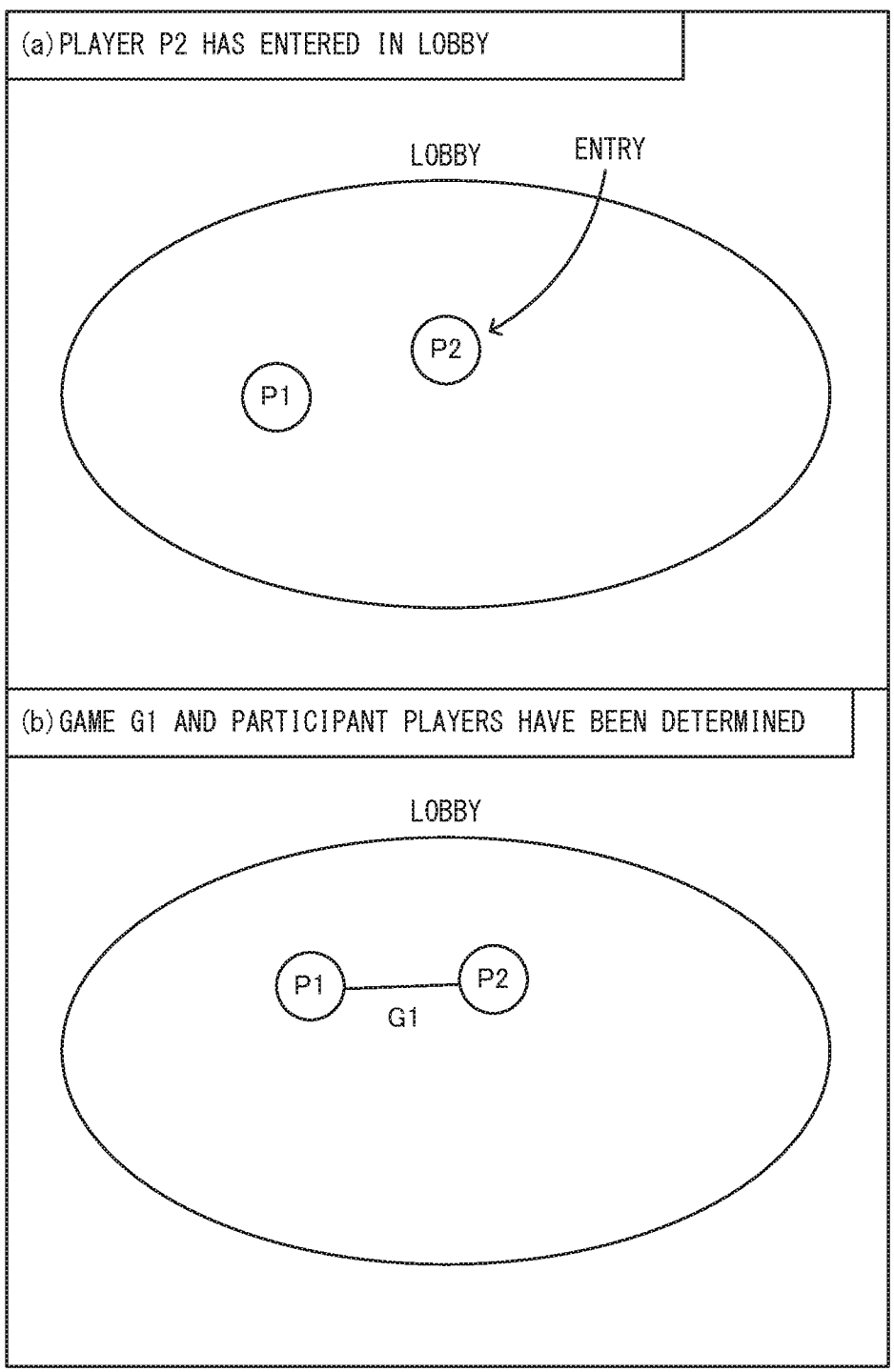
FIG. 13 is a diagram showing a non-limiting example state of players in a lobby.

FIG. 13 shows a state (a) in which a player P2 has newly entered a lobby set by a player P1. In this non-limiting example embodiment, the master terminal apparatus determines a game that is to be started (and participant players) in the game selection process based on the number of players who are ready to play of all players who are present in a lobby. Specifically, in the state (a), two players are ready to play, and therefore, the master terminal apparatus selects a game in which the number of participant players is two from a prepared game group (see FIG. 12). The master terminal apparatus also selects the two players P1 and P2, who are ready to play, as participant players in the selected game. Although a game selection method (i.e., a method for selecting a game that is to be started from a game group) in the game selection process is described in detail below, each game is selected from a game group in an unbiased manner, in this non-limiting example embodiment. Participant players are also selected such that each player is matched up with another player in an unbiased manner.

After a game and participant players have been thus selected by the game selection process, a game process for the game is started in each of the terminal apparatuses of the participant players. FIG. 13 also shows a state (b) in which the game G1 is being played by the participant players P1 and P2.

Figure 14:
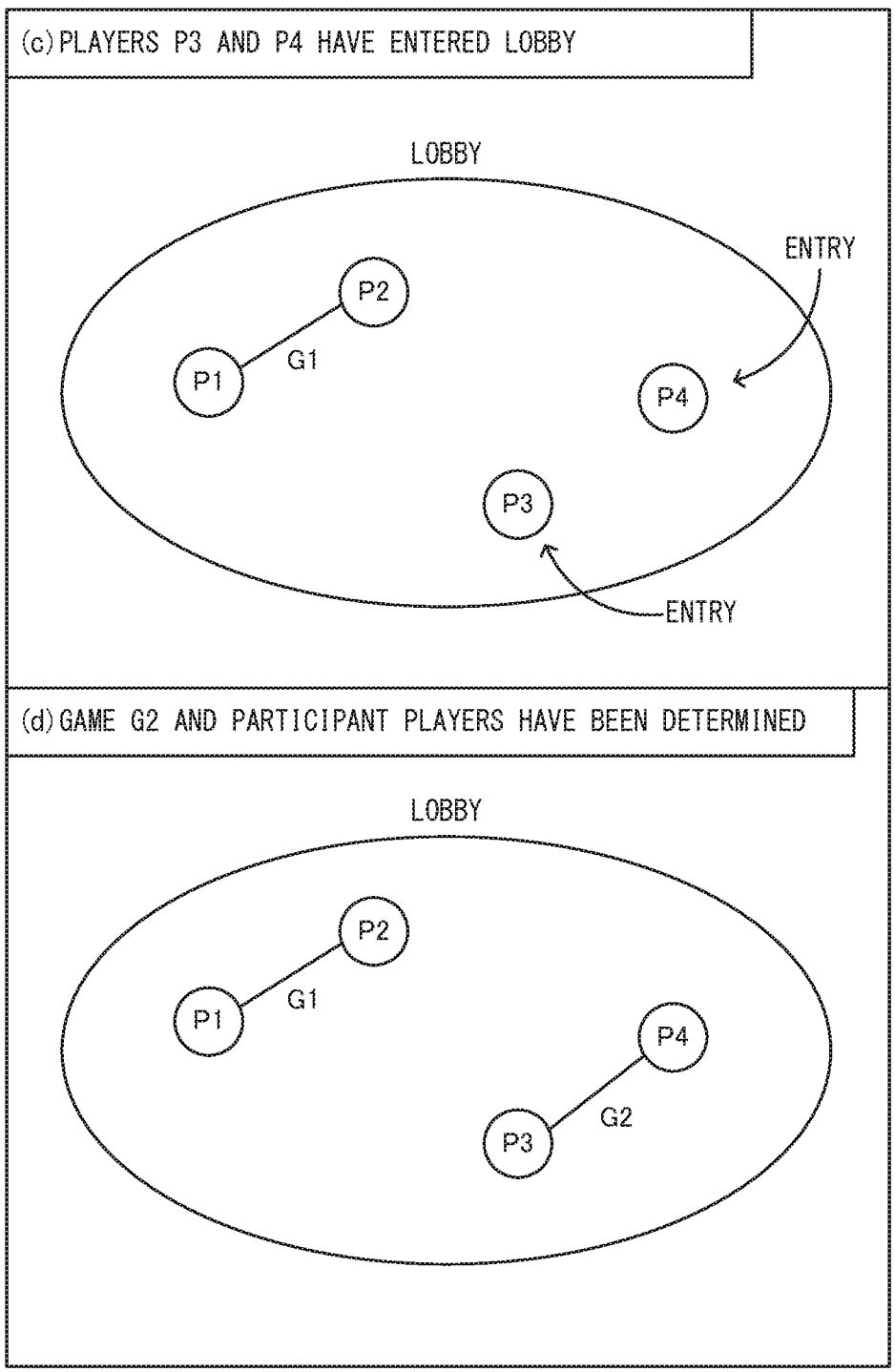
FIG. 14 is a diagram showing a non-limiting example state of players in a lobby.

FIG. 14 shows a state (c) in which, after the state (b), new players P3 and P4 have entered the lobby while the game G1 is being played. In the state (c), the two players P3 and P4 are ready to play. Therefore, the master terminal apparatus selects a game in which the number of participant players is two from the prepared game group. Here, it is assumed that the game G2, which is different from the game G1, is selected, and the players P3 and P4, who are ready to play, are selected as a participant player in the selected game G2. As a result, in each of the terminal apparatuses of the players P3 and P4, a game process for the game G2 starts to be executed. FIG. 14 also shows a state (d) in which the game G1 is being played by the participant players P1 and P2, and the game G2 is being played by the participant players P3 and P4. Thus, in this non-limiting example embodiment, matching-up is performed for one game while another game is being played in a single lobby, and different games may be simultaneously played (in other words, game processes for different games are executed in different terminal apparatuses).

Figure 15:
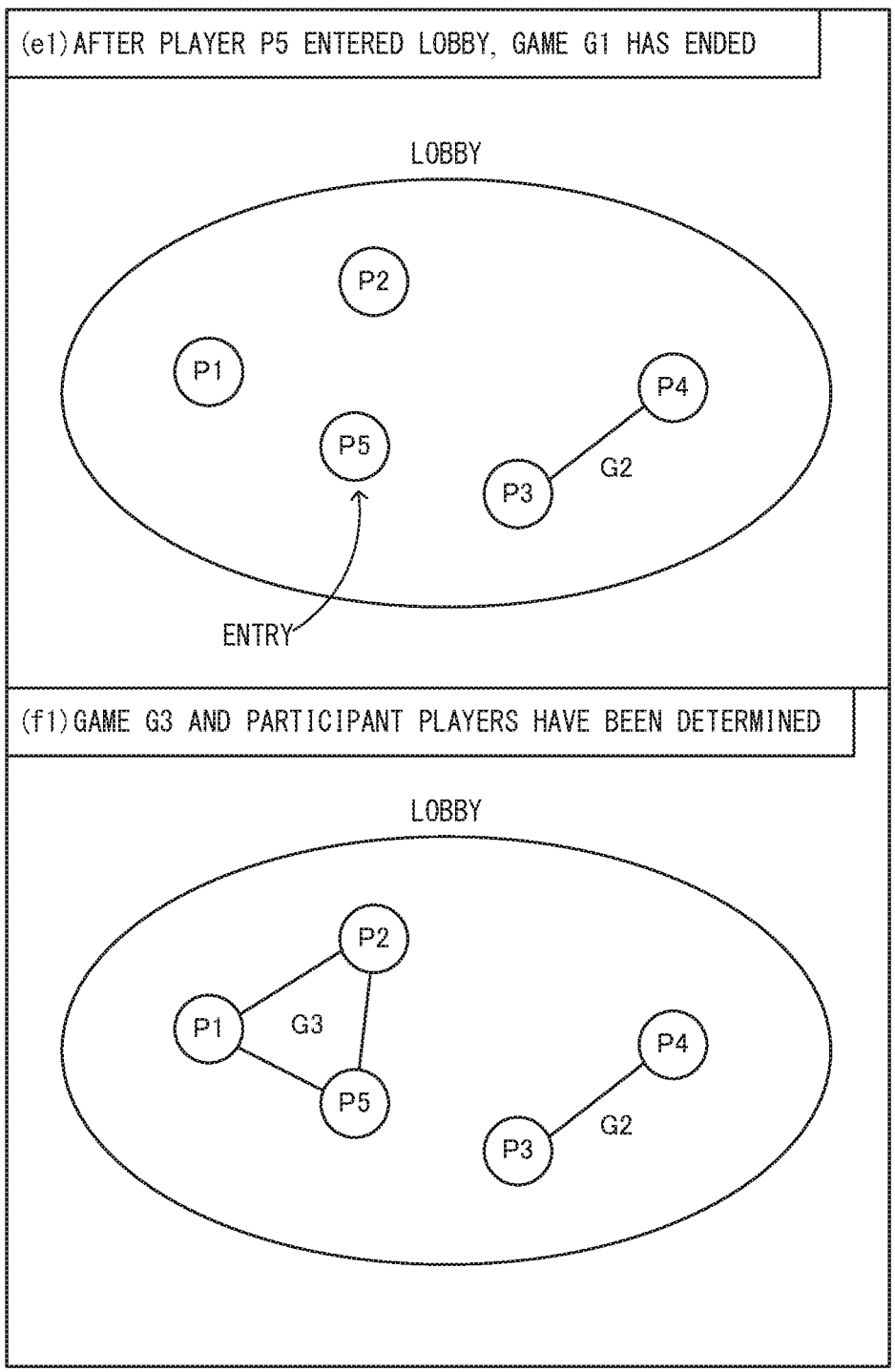
FIG. 15 is a diagram showing a non-limiting example state of players in a lobby.

FIG. 15 shows a state (e1) in which, after the state (d), a new player P5 has entered the lobby, and the game G1 has been ended. It should be noted that, in this non-limiting example embodiment, a game is ended under any suitable condition. For example, in the case of a fighting game, the game is ended when one player character beats the other, when the time limit of the game expires, or the like. For example, in the case of a game in which players fight against an enemy in corporation with each other, the game is ended when all player characters are beaten, when the enemy is beaten, when the time limit of the game expires, or the like. For example, in the case of a game in which players contend for points, the game is ended when the number of points (score) acquired by any player character reaches a predetermined score, when the time limit of the game expires, or the like.

In this non-limiting example embodiment, when a game is ended, the master terminal apparatus maintains the lobby entry state of each player who has been playing the game, and allows the players to be ready to play in the lobby (apparently, it can be said that the players have reentered the lobby). Therefore, it is not necessary for a player to send an instruction to allow the player to enter the lobby (i.e., an instruction to send a lobby entry request) again after the end of a game, and therefore, the player's time and effort can be removed.

In the state (e1), the three players P1, P2, and P5 are ready to play. Therefore, the master terminal apparatus selects a game in which the number of participant players is three from the prepared game group. Here, the game G3, in which the number of participant players is three, is selected, and the three players P1, P2, and P5, who are ready to play, are selected as participant players in the selected game G3. As a result, a game process for the game G3 starts to be executed in each of the terminal apparatuses of the players P1, P2, and P5. FIG. 15 also shows a state (f) in which the game G2 is being played by the participant players P3 and P4, and the game G3 is being played by the participant players P1, P2, and P5.

As described above, in this non-limiting example embodiment, a master terminal apparatus selects, from the game group, a game based on the number of players who are ready to play, automatically (i.e., without a player designating a game), and selects, from the players who are ready to play, participant players in the selected game, automatically (i.e., without a player designating participant players). For example, in the state (a), there are two players who are ready to play, and therefore, a game in which the number of participant players is two is selected. In the state (e1), there are three players who are ready to play, and therefore, a game in which the number of participant players is three is selected. Thus, in this non-limiting example embodiment, a game is selected the number of participant players of which corresponds to the number of players who are ready to play. As a result, a situation can be reduced in which players need to wait for a game to start until a fixed number of participant players required for the game are ready to play, and the waiting time imposed on players can be reduced.

(Determination of Game that is Nearly Finished)

Figure 16:
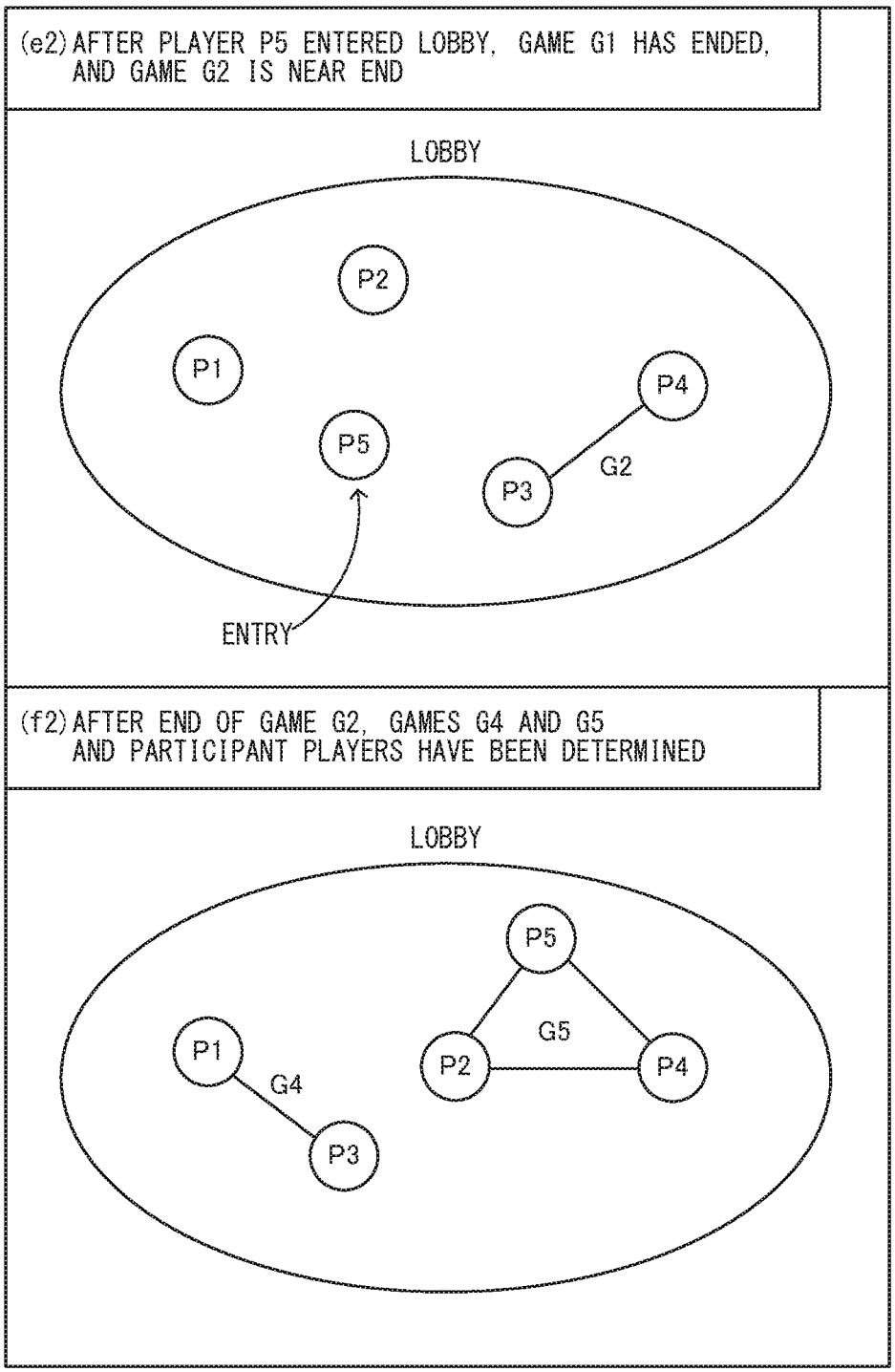
FIG. 16 is a diagram showing a non-limiting example state of players in a lobby.

Meanwhile, FIG. 16 shows a state (e2) in which, after the state (d), a new player P5 has entered the lobby, the game G1 has been ended, and the game G2 is nearly finished. The state (e2) is different from the state (e1) in that the game G2 is nearly finished. Here, examples of a state in which a game is nearly finished include:

a state in which one of player characters has a physical strength smaller than a predetermined value;

a state in which the remaining time until the end of the time limit of the game is a predetermined time or less; and a state in which one of player characters has a score greater than a predetermined value.

Although described in detail below, in this non-limiting example embodiment, a master terminal apparatus determines whether or not a game is nearly finished, based on a situation in the game (e.g., the physical strength, remaining time, score, etc., of each player character). In the case of the state (e2), the master terminal apparatus determines that the game G2 is nearly finished.

When, as in the state (e2), it has been determined that a game is nearly finished, the master terminal apparatus waits to execute the game selection process unlike the state (e1). After the end of the game that it has been determined is nearly finished, the master terminal apparatus executes the game selection process. Specifically, when the game G2 ends after the state (e2), the players P1-P5 are ready to play. Therefore, the master terminal apparatus selects a game and players based on the number of players who are ready to play. Here, the master terminal apparatus selects a game G4 in which the number of participant players is two, and selects the players P1 and P3 as participant players in the game G4. In addition, the master terminal apparatus selects a game G5 in which the number of participant players is three, and selects players P2, P4, and P5 as participant players in the game G5. As a result, a game process for the game G4 starts to be executed in each of the terminal apparatuses of the players P1 and P3, and a game process for the game G5 starts to be executed in each of the terminal apparatuses of the players P2, P4, and P5. FIG. 15 shows a state (f2) in which the game G4 is being played by the participant players P1 and P3, and the game G5 is being played by the participant players P2, P4, and P5.

As described above, in this non-limiting example embodiment, when a master terminal apparatus has determined that there is a game which is nearly finished, the master terminal apparatus does not select a new game until the end of the game that it has been determined is nearly finished, i.e., selects a new game after the end of the game which it has been determined is nearly finished. Here, it can be seen that, in the state (f2), a player can play a game with another player who that player has not ever played with, i.e., can play games with more other players, compared to state (f1). Thus, in this non-limiting example embodiment, after the end of a game which it has been determined is nearly finished, a new game is selected, and therefore, more variety can be added to the selection of a game and participant players, and more preferable selection can be thereby performed.

Figure 17:
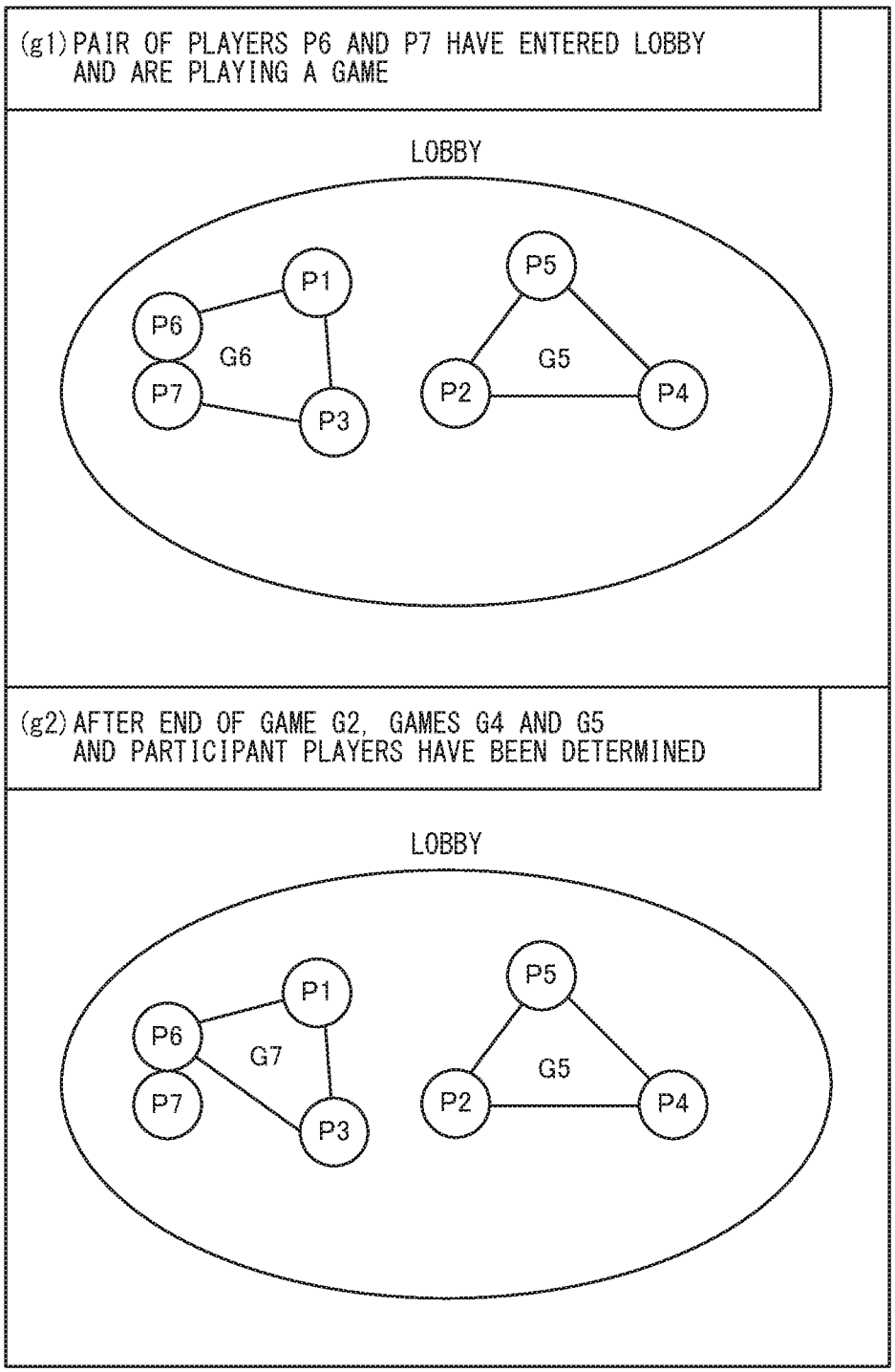
FIG. 17 is a diagram showing a non-limiting example state of players in a lobby.

FIG. 17 is a diagram showing a non-limiting example state in which a pair of players is present in a lobby. As described above, in this non-limiting example embodiment, a single terminal apparatus can be used by two players, and the two players who use the single terminal apparatus can be present in a single lobby. In this non-limiting example embodiment, a master terminal apparatus deals with two players who are present in a single lobby and use a single terminal apparatus, as a "pair of players." For a pair of players, the game selection process is executed as follows.

In this non-limiting example embodiment, a master terminal apparatus can determine a game and participant players so that both of a pair of players participate in a single game, for example, as in a state (g1) shown in FIG. 17. In the state (g1) of FIG. 17, a game G6 is being played by the participant players P1 and P3 and a pair of participant players P6 and P7, and the game G5 is being played by the participant players P2, P4, and P5.

Alternatively, a master terminal apparatus can determine a game and participant players so that one of a pair of players participates in the game, for example, as in a state (g2) shown in FIG. 17. In the state (g2) of FIG. 17, a game G7 is being played by the participant players P1 and P3 and a participant one (P6) of the pair of players P6 and P7, and the game G5 is being played by the participant players P2, P4, and P5. It should be noted that when a game and participant players are determined such that one of a pair of players participates in the game, a master terminal apparatus determines participant players such that a pair of players participate in games with substantially equal frequencies. For example, in the above case, a master terminal apparatus determines participant players such that a pair of players alternately participate in a game.

A master terminal apparatus does not determine a game and participant players such that while one of a pair of players participates in one game, the other player participates in another game. For example, in the state (g2), the game selection process is not executed so that the player P7 participates in a game different from the game G7. As a result, a situation can be avoided in which two different game processes are simultaneously executed in a single terminal apparatus, and therefore, a processing load on the terminal apparatus can be reduced.

(2-4. Non-limiting Example Displayed Lobby Images)

Next, lobby images displayed on the display 12 of a terminal apparatus 1 will be described with reference to FIGS. 18-21. A lobby image shows a state of a lobby. Specifically, a lobby image shows a player who is present in a lobby, and a state of the player. In this non-limiting example embodiment, when a player is ready to play, a lobby image is displayed on the terminal apparatus of the player. It should be noted that when a player is playing a game (except for a case where a game for a single participant is being played, which is described below), a game image is displayed on the terminal apparatus of the player.

Figure 18:
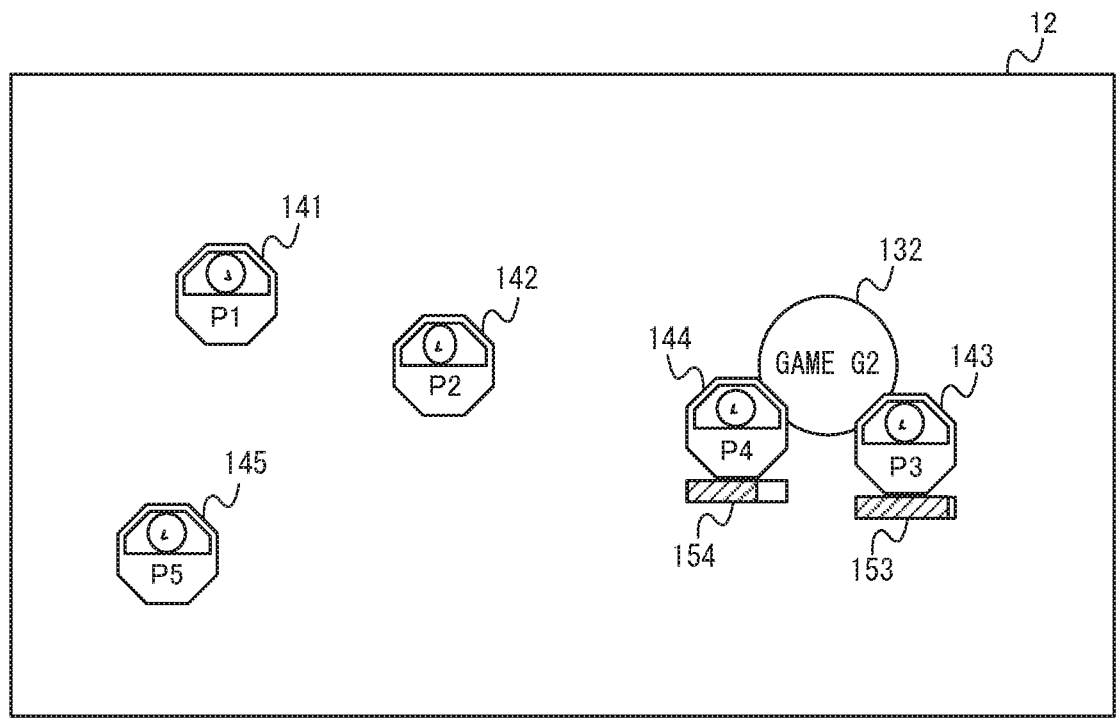
FIG. 18 is a diagram showing a non-limiting example lobby image.

FIG. 18 is a diagram showing a non-limiting example lobby image. It should be noted that FIG. 18 shows a lobby image displayed in the case of the state (e1) of FIG. 15. As shown in FIG. 18, the lobby image contains player icons 141-145 and a game icon 132.

A player icon is an image showing a player who is present in a lobby. A player icon is generated and displayed for each player who is present in a lobby. That is, in the non-limiting example of FIG. 18, the five player icons 141-145, which are contained in the lobby image, indicate the five players P1-P5, respectively. In this non-limiting example embodiment, a player icon contains an image indicating the name of a player (e.g., "P1" in FIG. 18). A player icon also contains an image indicating a player character operated by a player (i.e., an image indicating the face of the character). A player icon may be any suitable image with which a player can be identified. For example, in another non-limiting example embodiment, a player icon may contain an image indicating an avatar of a player.

A game icon is an image showing a game that is being played from a lobby (in other words, for which a game process is being executed). In the non-limiting example of FIG. 18, the game G2 is being played, and therefore, a lobby image contains the game icon 132 indicating the game G2. It should be noted that a game icon is generated and displayed for each game that is being played from a lobby (see FIG. 19).

In this non-limiting example embodiment, as shown in FIG. 18, the player icon of a player who is participating in a game (in FIG. 18, the player icons 143 and 144) is displayed in association with a game icon of the game (in FIG. 18, the game icon 132). Specifically, the player icon of a player who is participating in a game is in contact with (or integrated with) the game icon of the game. It should be noted that a player icon and a game icon are displayed in association with each other in any suitable display form. For example, in another non-limiting example embodiment, a game icon may be connected with a player icon associated with the game icon by a line.

Meanwhile, as shown in FIG. 18, the player icon of a player who is ready to play (in FIG. 18, the player icons 141, 142, and 145) are not associated with a game icon.

As described above, in this non-limiting example embodiment, when a game is executed from a lobby, a lobby image contains an image in which the game icon 132 of a game that is being played is associated with the player icons 143 and 144 of participant players in the game that is being played, and the player icons 141, 142, and 145 of players that are ready to play. This allows a terminal apparatus to indicate a game that is being played from a lobby, players participating in the game, and players who are ready to play in the lobby, using a lobby image, in a presentation manner that is easily understood by a player.

As shown in FIG. 18, when a game is being played from a lobby, a lobby image contains game state images 153 and 154. A game state image indicates a state of a game related to a player who is playing the game. In the non-limiting example of FIG. 18, the game state images 153 and 154 are a gauge image indicating the physical strength of a player character that is operated by a player in a game. It should be noted that a game state image may specifically indicate any suitable specific content of a game state. A game state image may indicate either a state of a player character (e.g., the physical strength, acquired score, etc., of the player character), or the remaining time in a game. As described below, a game state image may indicate different game states in different games (see FIG. 19).

A game state image is also displayed in association with the player icon of a player who is playing a game. In the non-limiting example of FIG. 18, the game state image 153 indicating a game state related to the player P3 is displayed in association with the player icon 143 of the player P3, and the game state image 154 indicating a game state related to the player P4 is displayed in association with the player icon 144 of the player P4. It should be noted that, in this non-limiting example embodiment, the association between a player icon and a game state image, if any, is indicated by the player icon and the game state image being located close to each other. It should be noted that a player icon and a game state image may be associated with each other in any suitable displaying manner.

As described above, in this non-limiting example embodiment, a lobby image contains at least information about a participant player in a game that is being played (e.g., information indicated by a player icon) and information about a state of the game (e.g., information indicated by a game state image). As a result, other players who are not playing a game (i.e., players of terminal apparatuses on which the lobby image is displayed) can be notified of a state of the game that is being played.

It should be noted that, in another non-limiting example embodiment, the "information about a state of a game" is not limited to information indicated by a game state image, and may be information indicated by other images. For example, in another non-limiting example embodiment, a terminal apparatus may present information about a state of a game to a player using a player icon. Specifically, a terminal apparatus may change a display form of a player icon corresponding to a player character, depending on a state of the player character in a game. For example, when a player character is attacked, a terminal apparatus may cause a displayed player icon corresponding to the player character to shake, or may change the color of the displayed player icon, depending on the physical strength of the player character.

Figure 19:
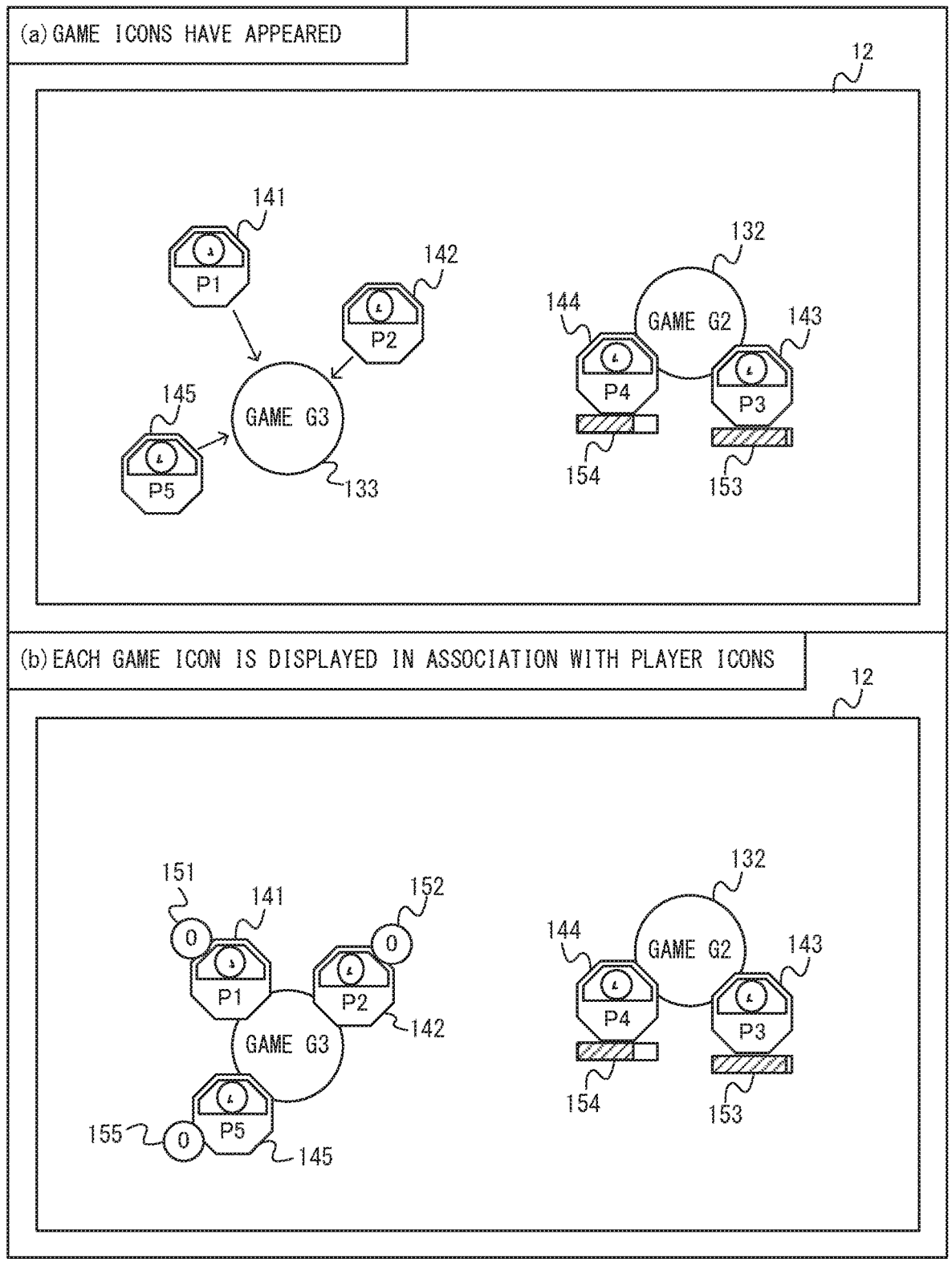
FIG. 19 is a diagram showing a non-limiting example lobby image that is displayed when a game is newly started.

FIG. 19 is a diagram showing a non-limiting example lobby image that is displayed when a game is newly started. It should be noted that FIG. 19 shows a non-limiting example lobby image that is displayed when the state (e1) is changed to the state (f1), i.e., the game G3 is started by the players P1, P2, and P5.

In the state (e1), when it has been determined that the game G3 is to be newly to started, a terminal apparatus (here, the terminal apparatuses of the players P1, P2, and P5) generates and displays a lobby image containing a game icon 133 indicating the game G3 ((a) in FIG. 19). Next, the terminal apparatus generates and displays, as a lobby image, a moving image (or an animation) in which the player icons 141, 142, and 145 of the players P1, P2, and P5 move toward the game icon 133 of the game G3.

Further, the terminal apparatus generates and displays a lobby image in which each of the player icons 141, 142, and 145 is associated with the game icon 133 of the game G3 ((b) in FIG. 19). In this case, game state images 151, 152, and 155 are displayed in association with the player icons 141, 142, and 145, respectively. It should be noted that, in this non-limiting example embodiment, a player character wins the game G3 if the player character gets a predetermined number of points. Therefore, the game state images 151, 152, and 155 each indicate the current score of a corresponding player character (each score is "0" because the current time is before the start of the game in FIG. 19).

It should be noted that after the lobby image in part (b) of FIG. 19 is displayed, the lobby image is changed to a game image of the game G3, and a game process for the game G3 is started, in the terminal apparatuses of the players P1, P2, and P5.

As described above, in this non-limiting example embodiment, when a game and participant players are selected, a terminal apparatus generates an image (or a moving image) in which player icons indicating selected participant players are associated with a game icon indicating the selected game (FIG. 19). As a result, a player who views a lobby image can easily recognize a game that is to be next started, and players who are to participate in the game.

Figure 20:
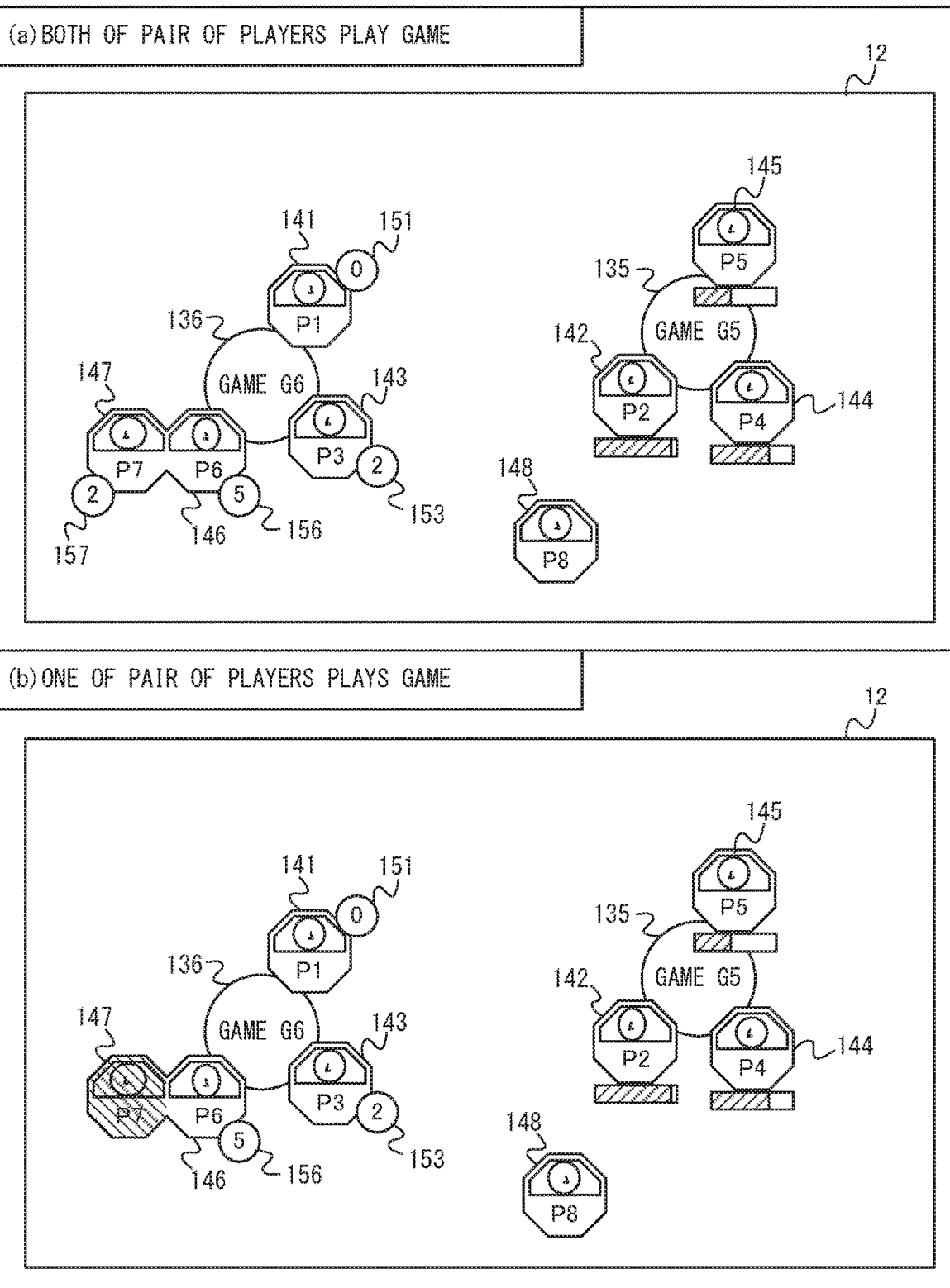
FIG. 20 is a diagram showing a non-limiting example lobby image that is displayed when a pair of players are present in a lobby.

FIG. 20 is a diagram showing a non-limiting example lobby image that is displayed when a pair of players are present in a lobby. In this non-limiting example embodiment, the player icons of a pair of players are displayed in association with each other. Specifically, as shown in FIG. 20, player icons 146 and 147 indicating the pair of players P6 and P7 are displayed in an integrated form. It should be noted that the player icons of a pair of players may be displayed in association with each other in any suitable method. Furthermore, in this non-limiting example embodiment, the player icons of a pair of players are moved while being maintained in the integrated form.

As described above, in this non-limiting example embodiment, a terminal apparatus generates an image in which the player icons of a plurality of players (i.e., a pair of players) who operate a single terminal apparatus are associated with each other. As a result, a player who views such a lobby image can easily recognize whether or not players are a pair of players. It should be noted that, in this non-limiting example embodiment, different methods for selecting a game are used in the game selection process, depending on whether or not a pair of players are among players who are ready to play (step S14 described below). Therefore, it is advantageous to allow each player to recognize whether or not players are a pair of players.

Part (a) of FIG. 20 shows a non-limiting example lobby image that is displayed when both of a pair of players are participating in a game. As shown in part (a) of FIG. 20, the player icons 146 and 147 of the pair of players are displayed in association with a game icon 136 indicating a game that is being played by the players, like the player icon of a player who is not a pair of players. Here, when both of the pair of players are participating in the game, both of the player icons 146 and 147 are displayed in the same display form as shown in part (a) of FIG. 20. In addition, game state images 156 and 157 are displayed in association with the player icons 146 and 147, respectively.

Part (b) of FIG. 20 shows a non-limiting example lobby image that is displayed when only one of a pair of players is participating in a game. In this non-limiting example, as in the case where both of a pair of players are participating in a game, the player icons 146 and 147 of the pair of players are displayed in association with the game icon 136 of the game that are being played by a player. Here, when only one of a pair of players is participating in a game, the player icons of the pair of players are displayed in a display form that allows the participant one in the game to be identified. Specifically, the player icon 146 of the player who is participating in the game, and the player icon 147 of the player who is not participating in the game, are displayed in different display forms (in different colors in part (b) of FIG. 20; in part (b) of FIG. 20, a different color is represented by hatching). A game state image 156 is also displayed in association with the player icon 146 of the player who is participating in the game, and no game state image is displayed in association with the player icon 147 of the player who is not participating in the game.

As described above, in this non-limiting example embodiment, the player icons of a pair of players are displayed in different display forms, depending on whether one or both of the pair of players are participating in a game. This allows a player who views such a lobby image to easily recognize which of a pair of players is participating in a game.

It should be noted that, as shown in FIG. 20, even when a single terminal apparatus is used by a pair of players (as in the case where a terminal apparatus is used by a single player), the terminal apparatus displays, on the display 12, a single lobby image without dividing the screen area of the display 12.

(Single-Player Game)

As described above, in this non-limiting example embodiment, a multiplayer game is selected by the game selection process. Here, in this non-limiting example embodiment, a terminal apparatus provides a single-player game which can be played by a player who is ready to play, in addition to a multiplayer game group that is to be selected by the game selection process. That is, a terminal apparatus executes a game process for a single-player game according to an instruction from a player who is ready to play. A single-player game will now be described.

In this non-limiting example embodiment, when a lobby image is being displayed on the display 12 of a terminal apparatus (i.e., the player thereof is ready to play), the terminal apparatus allows the player to input an instruction to start a single-player game. For example, a lobby image may contain a button image indicating an instruction to start a single-player game. In this case, the terminal apparatus may start a game process for a single-player game in response to selection of the button image by the player. Thus, in this non-limiting example embodiment, when a player is ready to play in a lobby, the player can play a single-player game if desired, and therefore, the player is less likely to feel bored while being ready to play, i.e., during a waiting time.

In this non-limiting example embodiment, a single-player game is ended when a player who is playing the game issues an instruction to end the game. The terminal apparatus ends a single-player game according to an instruction to end, and thereafter, displays a lobby image on the display 12.

Figure 21:
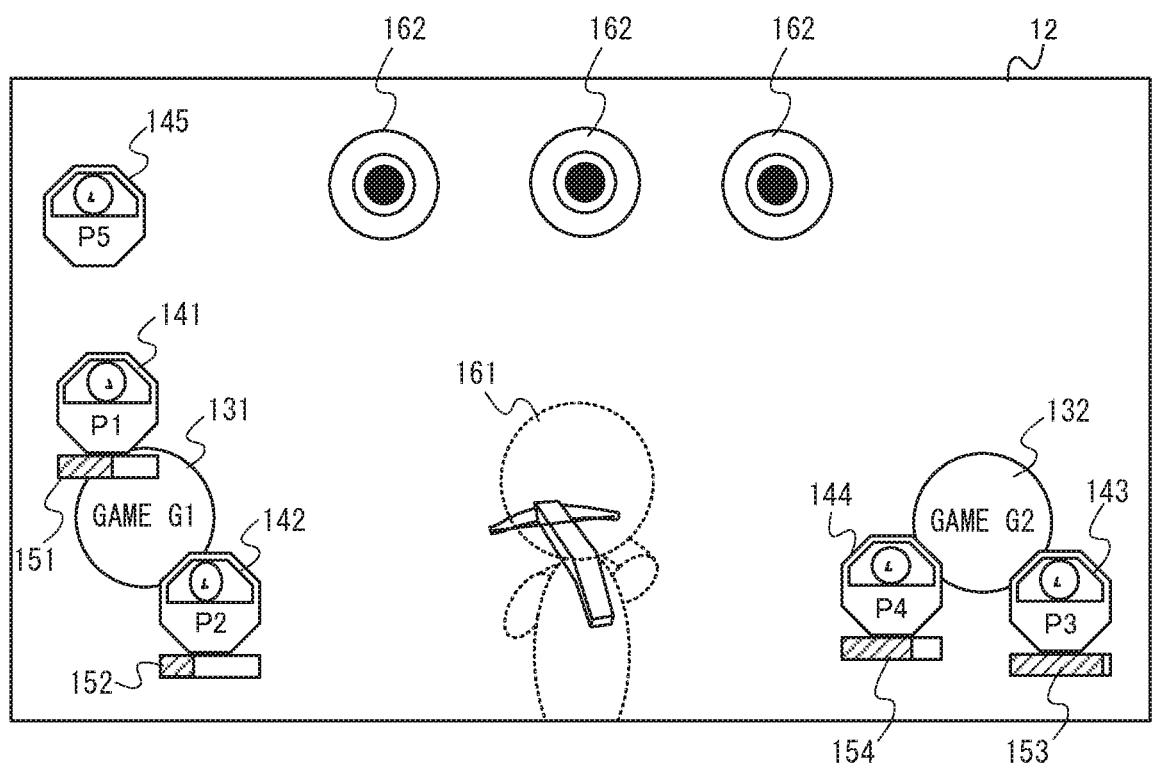
FIG. 21 is a diagram showing a non-limiting example game image of a single-player game.

FIG. 21 is a diagram showing a non-limiting example game image of a single-player game. FIG. 21 shows a game image of a single-player game in which a player character 161 shoots a target 162. It should be noted that the content of a single-player game is not particularly limited, and a plurality of single-player games may be prepared.

As shown in FIG. 21, when a single-player game is being played, the player icons 141-145 and the game icons 131 and 132 (may be regarded as a "lobby image") are displayed in addition to a game image of the single-player game. Therefore, in this non-limiting example embodiment, a player can know a state of a lobby while playing a single-player game. For example, a player who is playing a single-player game can know a state of a lobby from a lobby image, and end the single-player game, depending on the state of the lobby.

It should be noted that a player who is playing a single-player game is managed as a player who is ready to play. That is, when a player is playing a single-player game, then if a lobby image is displayed on the terminal apparatus of another player, a player icon of the player who is playing a single-player game indicates, in the lobby image, that that player is ready to play (in other words, that player is not playing a game). It should be noted that, in another non-limiting example embodiment, a terminal apparatus may display a player icon indicating that the player is playing a single-player game.

Furthermore, in this non-limiting example embodiment, not only ended is a single-player game according to an instruction to end the single-player game that is issued by a player who is playing the game, but also a single-player game is ended when a game in which the player is to participate is newly selected by the game selection process. It should be noted that, in this case, the terminal apparatus ends a game process for the single-player game even when the player does not issue an instruction to end the game. Therefore, in this non-limiting example embodiment, a player is matched up in a game even when the player is playing a single-player game. It should be noted that, in another non-limiting example embodiment, a terminal apparatus may send a notification to a player before the player ends a single-player game. In this case, a terminal apparatus may prompt a player to issue an instruction to end a single-player game, and when the player issues an instruction to end the single-player game, the single-player game may be ended.

It should be noted that, as described above, in this non-limiting example embodiment, a player can know a state of a lobby while playing a single-player game (FIG. 21). For example, when the game selection process has newly selected a game in which a player who is playing a single-player game is to participate, a moving image in which a game icon of the game appears, and a player icon of the player is associated with the game icon, is displayed together with a game image of the single-player game. Therefore, the player can know that the single-player game will end soon even in the case where the single-player game is forced to end (i.e., the single-player game is ended without an instruction to end the game), based on the movement of the player icon.

[3. Specific Non-Limiting Example Processes in Terminal Apparatuses]

(3-1. Process in Master Terminal Apparatus)

Figure 22:
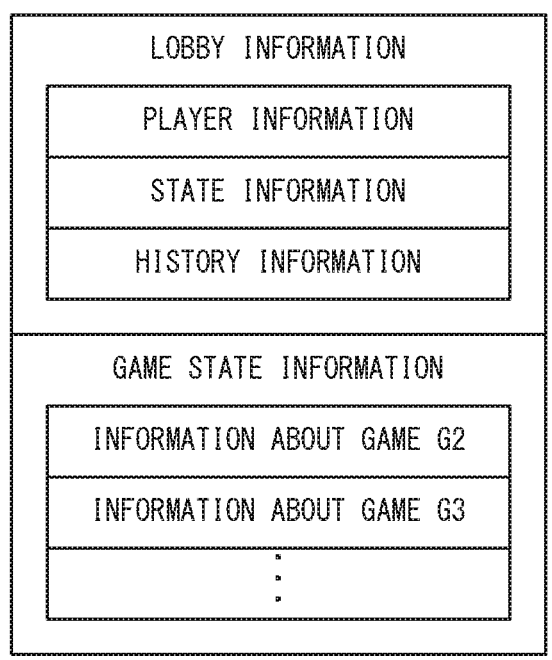
FIG. 22 is a diagram showing non-limiting example information that is used in a process performed in a master terminal apparatus.

A specific non-limiting example information process that is executed by a terminal apparatus serving as a master terminal apparatus will be described with reference to FIGS. 22-24. FIG. 22 is a diagram showing non-limiting example information that is used in a process performed in a master terminal apparatus. The information of FIG. 22 is stored in a storage section (e.g., the DRAM 85) of a master terminal apparatus.

As shown in FIG. 22, a master terminal apparatus stores lobby information. The lobby information indicates a state of a lobby (e.g., a player(s) who is present in the lobby, a state of the player, a game(s) that is being played from the lobby, and/or a player(s) who is participating in the game, etc.). In this non-limiting example embodiment, the lobby information contains player information, state information, and history information of a player who is present in a lobby. The player information, the state information, and the history information are stored in association with each other for each player. The lobby information may be considered group information indicating a group of players who can play a plurality of games, like the lobby setting information stored in the server 10.

The player information, which can be used to identify a player, indicates the above player identification information, for example. The state information indicates a state of a player, particularly whether a player is ready to play or is playing a game, and what game is being played if the player is playing any game. The history information indicates a history related to game plays of a player. In this non-limiting example embodiment, the history information contains information indicating games that have been played by a player present in a lobby (including the order in which the games have been played), and information indicating another player(s) who has participated in the games.

Although described in detail below, the history information is used to select a game that is to be started, in the game selection process.

FIG. 23 is a diagram showing a specific non-limiting example piece of lobby information. It should be noted that FIG. 23 shows a non-limiting example piece of lobby information indicating the state (e1). In FIG. 23, the lobby information contains player information indicating the player P1, state information indicating that the player P1 is ready to play, and history information indicating a history in which the player P1 has played the game G1 together with the player P2. The lobby information also contains player information indicating the player P2, state information indicating that the player P2 is ready to play, and history information indicating a history in which the player P2 has played the game G1 together with the player P1. For the players P3 and P4, the lobby information contains state information indicating that each player is playing the game G2, and history information indicating that each player has no play records in their history. For the player P5, the lobby information contains state information indicating that the player is ready to play, and history information indicating that the player has no play records in their history. A master terminal apparatus can manage a state of a lobby using lobby information.

As shown in FIG. 22, a master terminal apparatus stores game state information. The game state information indicates a state related to a game that is being played from a lobby. For example, the game state information indicates the physical strength of a player character, points (score) that have been acquired by the player character, and/or the remaining time of a game. The game state information is stored for each game and may contain different items of information for different games. A master terminal apparatus receives state notification information from a game management terminal of slave terminal apparatuses, and updates the game state information based on the received state notification information. Although described in detail below, the game management terminal is a terminal apparatus that manages the progress of a multiplayer game performed in each terminal apparatus. The state notification information contains information indicating a state of a game, such as the physical strength of a player character, points that have been acquired by the player character, and/or the remaining time of the game. Although described in detail below, the game state information is used to generate a game state image contained in a lobby image, for example. It should be noted that the game state information is removed when a corresponding game is ended.

Figure 24:
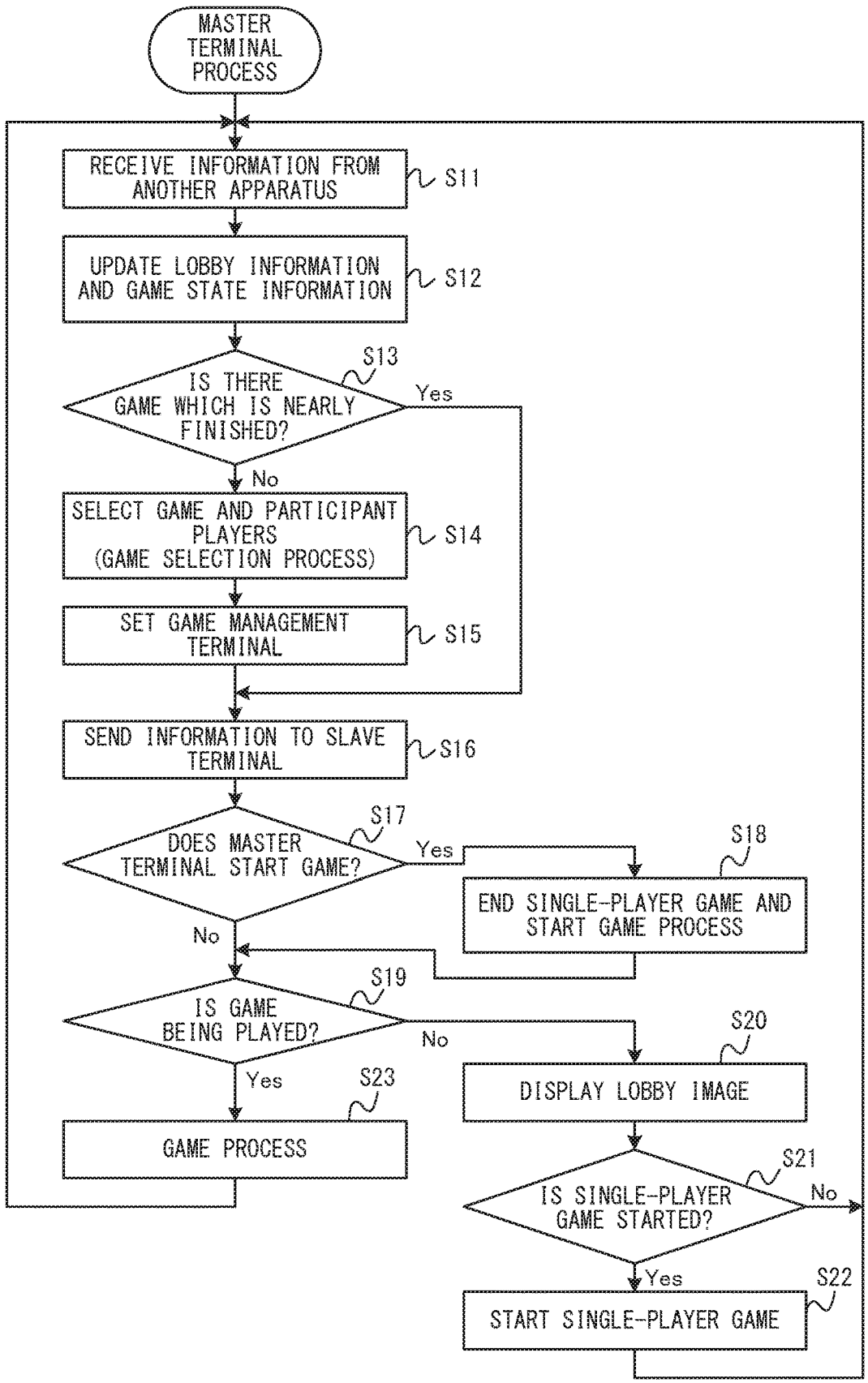
FIG. 24 is a flowchart showing a non-limiting example flow of a process performed by a master terminal apparatus.

FIG. 24 is a flowchart showing a non-limiting example flow of a process performed by a master terminal apparatus (hereinafter referred to as a "master terminal process"). It should be noted that a series of steps shown in FIG. 24 is started in response to reception of the above lobby creation notification (step S2) from the server 10 (step S3).

Although, in this non-limiting example embodiment, it is assumed that the CPU 81 included in a terminal apparatus 1 executes the steps of FIG. 24 (or FIG. 25), a portion of the steps of the flowchart may be executed by a processor other than a CPU or a dedicated circuit. Furthermore, the steps of the flowchart of FIG. 24 are merely for illustrative purposes. Some or all of the steps may be performed in other orders, and other steps may be added or substituted, provided that similar effects are obtained (this is also true for a flowchart shown in FIG. 25).

In the master terminal process, the CPU 81 initially receives information from other apparatuses in step S11. That is, the CPU 81 receives information from the server 10 and another terminal apparatus (i.e., the terminal apparatus of another player who is present in the same lobby) through the network communication section 82. For example, the CPU 81 receives the above lobby entry notification from the server 10. When a game is being played from the lobby, the CPU 81 receives the state notification information from a game management terminal described below, and if its own master terminal apparatus is executing a game process, receives information about a game process from another terminal apparatus that is executing the same game. After step S11, control proceeds to step S12.

In step S12, the CPU 81 updates the lobby information and the game state information stored in the storage section. The lobby information is updated based on the information received in step S11, for example. That is, when receiving a lobby entry notification from the server 10, the CPU 81 updates the lobby information so that the player information, state information, and history information of a player who has newly entered the lobby are added to the lobby information. When receiving the state notification information from the game management terminal, then if the contents of the state information and history information need to be changed (e.g., the state notification information contains information indicating the end of a game), the CPU 81 updates the lobby information so that these items of information are changed. It should be noted that, as described above, even when receiving the state notification information containing information indicating the end of a game, the CPU 81 maintains the state in which each player who has been playing the game is present in the lobby, and updates the lobby information so that each player is ready to play in the lobby. In addition, when the contents of the state information and history information need to be changed due to a game process that is being executed by the master terminal apparatus, the CPU 81 updates the lobby information so that these items of information are changed.

The game state information is updated based on the information received in step S11, for example. That is, when receiving the state notification information from the game management terminal, the CPU 81 updates the game state information based on the state notification information if necessary. In addition, when the content of the game state information needs to be changed due to a game process that is being executed by the master terminal apparatus, the CPU 81 updates the game state information. After step S12, control proceeds to step S13.

In step S13, the CPU 81 determines whether or not there is a game that is being played and is nearly finished. In this non-limiting example embodiment, the determination in step S13 is performed based on the game state information (e.g., the physical strength of a player character, points that have been acquired by the player character, and/or the remaining time of the game) stored in the storage section. That is, the CPU 81 determines, based on the game state information, whether or not there is a game that is "near the end" as defined in the above section "(Determination of Game that Is Nearly Finished)." If the determination result of step S13 is negative, control proceeds to step S14. Otherwise, steps S14 and S15 are skipped, and control proceeds to step S16 described below. That is, when there is a game that is nearly finished, the game selection process (step S14) is skipped.

In step S14, the CPU 81 executes the above game selection process. That is, the CPU 81 determines a game that is to be next started, and participant players in the game, based on the number of players who are ready to play in the lobby.

In this non-limiting example embodiment, the CPU 81 determines a game and participant players according to the following criteria:

- a game is less likely to be selected if one player remains ready to play when that game is selected (e.g., when five players are ready to play, a game in which the number of participant players is four is less likely to be selected);
- a game and participant players are more likely to be selected if the players have not recently played that game together;
- a game is more likely to be selected if the game has not recently been played by players;
- a game is less likely to be selected if the game is similar to a game that has recently been played (e.g., similar in rules); and
- a game is more likely to be selected if the game allows a pair of players to participate therein, when there is a pair of players who are ready to play.

In this non-limiting example embodiment, the CPU 81 checks the criteria based on the history information contained in the lobby information. It should be noted that the CPU 81 may partly randomly select a game and participant players in the game selection process. That is, the CPU 81 may use the criteria and random numbers to select a game and participant players.

As described above, in this non-limiting example embodiment, a master terminal apparatus selects a game based on a history of games that have been played by a plurality of players who are present in a lobby. This allows for selection of a game that is more preferable to players. For example, the possibility that the same game is repeatedly selected and therefore players lose interest in the game can be reduced. In addition, for example, a group of games prepared in a lobby can be provided to players in an unbiased manner.

It should be noted that when, in step S14, the CPU 81 has determined that there is not a suitable game that is to be selected, according to the criteria, the CPU 81 may not select a game (and participant players) and may end step S14. In this case, after the end of any current game, a game and participant players are selected. This can reduce the possibility that an unsuitable combination of a game and participant players is selected.

It should be noted that the CPU 81 may determine whether or not it is necessary to wait for a long time until the end of any current game. If the determination result is positive (even if it has been determined that there is not a suitable game to be selected), a game and participant players may be selected in step S14. Otherwise (and if it has been determined that there is not a suitable game to be selected), a game and participant players may not be selected in step S14. It should be noted that the determination of whether or not it is necessary to wait for a long time until the end of any current game can be performed based on the game state information, as with the determination of whether or not there is a game that is nearly finished (step S13). As described above, the criteria checked in the game selection process may be changed, depending on the result of the determination of whether or not it is necessary to wait for a long time until the end of any current game (or depending on the waiting time).

It should be noted that if, in step S14, the number of players who are ready to play is zero or one, the CPU 81 does not perform the determination of a game and participant players. In this case, control proceeds to step S16 without execution of step S14 or S15.

If, in step S14, a game and participant players have been determined, the CPU 81 updates the lobby information stored in the storage section with the determination result. After step S14, control proceeds to step S15.

In step S15, the CPU 81 sets a game management terminal that is involved with the game determined in step S14. As described above, the game management terminal is a terminal apparatus that manages the progress of a multiplayer game performed in each terminal apparatus. For example, the game management terminal manages (or stores) data that is used in the progress of a game. It should be noted that the data is used in a game process in each terminal apparatus, such as the remaining time, the physical strength of each player character, and points that have been acquired by each player character, etc. Each terminal apparatus that plays a game executes a game process based on the data managed by the game management terminal. It should be noted that if a game has not been determined in step S14, a game management terminal is not set in step S15.

In this non-limiting example embodiment, one of the terminal apparatuses of players who it has been determined in step S14 are to participate in the game is selected as a game management terminal. Here, if the player of the master terminal apparatus is not participating in the game determined in step S14, the CPU 81 sets one of the terminal apparatuses of players who are to participate in the game, as a game management terminal. In this case, any suitable method is used to select a game management terminal. A game management terminal may be determined randomly or under a predetermined condition (e.g., the order in which players have entered a lobby).

It should be noted that when the player of the master terminal apparatus participates in the game determined in step S14, the CPU 81 may set its own terminal apparatus (i.e., the master terminal apparatus) as a game management terminal. This allows the master terminal apparatus not to obtain the state notification information from a slave terminal apparatus, and therefore, the amount of data exchanged between the terminal apparatuses can be reduced. Furthermore, in another non-limiting example embodiment, even when the player of the master terminal apparatus participates in the game determined in step S14, the CPU 81 may select one of the slave terminal apparatuses as a game management terminal. This can reduce a processing load on the master terminal apparatus. After step S15, control proceeds to step S16.

In step S16, the CPU 81 sends various items of information to a slave terminal apparatus. Specifically, the CPU 81 sends information that is used to generate a lobby image to the slave terminal apparatus of each player who is present in the lobby. More specifically, the CPU 81 sends the player information and state information contained in the lobby information updated in steps S12 and/or S14, and the game state information updated in step S12, to each slave terminal apparatus.

If a game has been determined in step S14, the CPU 81 sends a request for start of the game (referred to as a "game start request"), to the slave terminal apparatus of participant players in the game. In this case, the CPU 81 also sends a request for operation as a game management terminal (referred to as a "game management request"), to the slave terminal apparatus that has been set as a game management terminal in step S15, together with the game start request. After step S16, control proceeds to step S17.

In step S17, the CPU 81 determines whether or not the game is to be started in its own terminal apparatus (i.e., the master terminal apparatus). The determination in step S17 is performed by, for example, the CPU 81 determining whether or not the player of its own terminal apparatus is among the participant players determined in step S14. If the determination result of step S17 is positive, control proceeds to step S18. Otherwise, step S18 is skipped, and control proceeds to step S19.

In step S18, the CPU 81 starts a game process for the game determined in step S14. That is, the CPU 81 reads a program for executing a game process for the game from a storage medium inserted in the first slot 23, and starts executing the program. It should be noted that, in this case, when the CPU 81 is executing a game process for a single-player game, the CPU 81 ends the game process for the single-player game. After step S18, control proceeds to step S19.

In step S19, the CPU 81 determines whether or not a game process is being executed (in other words, a game is being played) in its own terminal apparatus. That is, the CPU 81 determines whether or not the game process started in step S18 or a game process for a single-player game is being executed. If the determination result of step S19 is negative, control proceeds to step S20. Otherwise, control proceeds to step S23 described below.

In step S20, the CPU 81 displays a lobby image on the display 12. That is, the CPU 81 generates a lobby image based on the lobby information and game state information stored in the storage section, and displays the generated lobby image on the display 12. It should be noted that, in this non-limiting example embodiment, when a lobby image is being displayed (i.e., the player of the terminal apparatus is ready to play, and is not playing a single-player game), step S20 is executed at a rate of once per predetermined period of time (i.e., a one-frame time). After step S20, control proceeds to step S21.

In step S21, the CPU 81 determines whether or not to start a single-player game. Here, the CPU 81 identifies an operation (or an instruction) performed by the player based on data obtained from an input section (i.e., a touch panel and buttons) of the main body apparatus 2, and operation data from a controller. In step S21, the CPU 81 determines whether or not the player has instructed to start a single-player game. If the determination result of step S21 is positive, control proceeds to step S22. Otherwise, control proceeds to step S11 again.

In step S22, the CPU 81 starts a game process for a single-player game. That is, the CPU 81 reads a program for executing the game process for the single-player game from a storage medium inserted in the first slot 23, and starts executing the program. After step S22, control proceeds to step S11 again.

Meanwhile, in step S23, the CPU 81 executes a game process. That is, the CPU 81 executes the game process after having started the game process (i.e., a game process for a multiplayer game) in step S18, and executes a game process for a single-player game after having started executing the game process for the single-player game in step S22. It should be noted that, in this non-limiting example embodiment, during a period of time in which the determination result of step S19 is positive, step S23 is executed at a rate of once per predetermined period of time (i.e., a one-frame time).

It should be noted that when a game process for a multiplayer game is executed in step S23, a game image is generated and displayed on the display 12. In this case, a lobby image is not generated or displayed. Meanwhile, when a game process for a single-player game is executed in step S23, a game image and a lobby image are generated and displayed on the display 12 (FIG. 21). After step S23, control proceeds to step S11 again.

(3-2. Process in Slave Terminal Apparatus)

Figure 25:
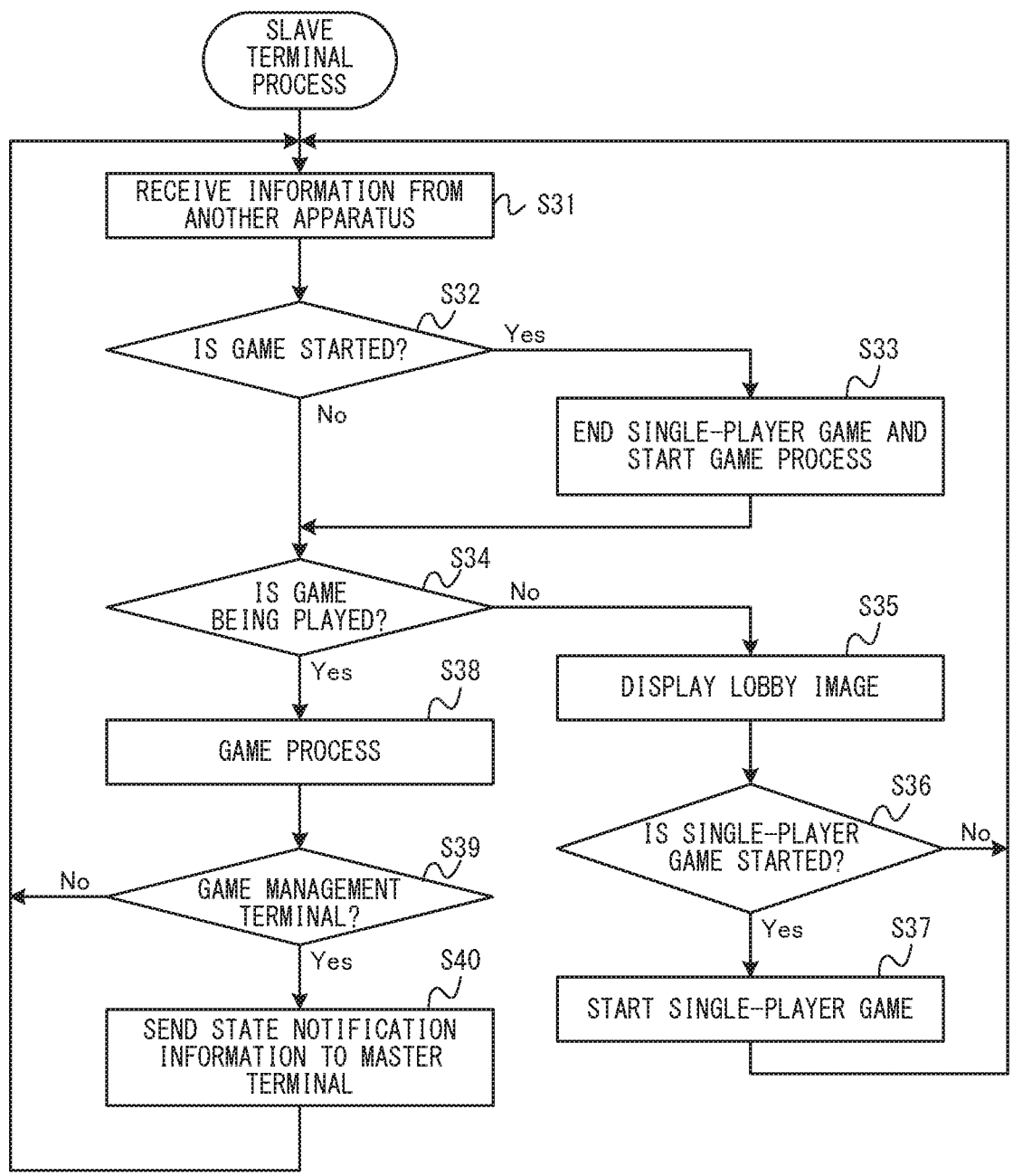
FIG. 25 is a flowchart showing a non-limiting example flow of a process performed by a slave terminal apparatus.

FIG. 25 is a flowchart showing a non-limiting example flow of a process performed by a slave terminal apparatus (hereinafter referred to as a "slave terminal process"). It should be noted that a series of steps shown in FIG. 25 is started in response to reception of the above lobby entry notification (step S6) from the server 10.

In step S31, the CPU 81 receives information from another apparatus. Step S31 is similar to step S11. It should be noted that a terminal apparatus that executes step S31 is a slave terminal apparatus. Therefore, the CPU 81 receives information that is sent from the master terminal apparatus in step S16. In step S31, the CPU 81 does not receive the state notification information from the game management terminal. After step S31, control proceeds to step S32.

In step S32, the CPU 81 determines whether or not to start a game in its own terminal apparatus. The determination in step S32 is performed based on whether or not a game start request has been received from the master terminal apparatus in step S31. If the determination result of step S32 is positive, control proceeds to step S33. Otherwise, step S33 is skipped, and control proceeds to step S34 described below.

In step S33, the CPU 81 starts a game process for a game indicated by the game start request received in step S31. Step S33 is similar to step S18. It should be noted that, in step S33, when a game process for a single-player game is being executed, the CPU 81 ends the game process for the single-player game, as in step S18. After step S33, control proceeds to step S34.

In step S34, the CPU 81 determines whether or not a game process is being executed (in other words, a game is being played) in its own terminal apparatus. That is, the CPU 81 determines whether or not the game process that has been started in step S33 or a game process for a single-player game is being executed. If the determination result of step S34 is negative, control proceeds to step S35. Otherwise, control proceeds to step S38 described below.

In step S35, the CPU 81 displays a lobby image on the display 12. That is, the CPU 81 generates a lobby image base on the information (i.e., the player information and state information contained in the lobby information, and the game state information) received from the master terminal apparatus in step S31, and displays the generated lobby image on the display 12. It should be noted that, in this non-limiting example embodiment, when a lobby image is displayed (i.e., when the player of the terminal apparatus is ready to play, and is not playing a single-player game), step S35 is executed at a rate of once per predetermined period of time (i.e., a one-frame time). After step S35, control proceeds to step S36.

As described above, in this non-limiting example embodiment, information for generating a lobby image is sent from a master terminal apparatus to a slave terminal apparatus. That is, a master terminal apparatus sends information indicating a state of a lobby to a slave terminal apparatus, which then generates a lobby image based on the information received from the master terminal apparatus. As a result, a lobby image based on a state of a lobby managed by a master terminal apparatus can be displayed on a slave terminal apparatus. That is, a state of a lobby can be presented to the player of each terminal apparatus.

It should be noted that a lobby image displayed on a master terminal apparatus and a lobby image displayed on a slave terminal apparatus only need to indicate a state of a lobby of the same type (e.g., a player present in a lobby, and a state of the player), and do not need to be exactly identical. For example, in a lobby image displayed on a master terminal apparatus and a lobby image displayed on a slave terminal apparatus, player icons and game icons may be displayed at different positions. That is, information sent from a master terminal apparatus to a slave terminal apparatus may not contain information for specifying positions at which player icons and game icons are displayed. This can reduce the amount of data exchanged between a master terminal apparatus and a slave terminal apparatus.

In step S36, the CPU 81 determines whether or not to start a single-player game. Step S36 is similar to step S21. If the determination result of step S36 is positive, control proceeds to step S37. Otherwise, control proceeds to step S31 again.

In step S37, the CPU 81 starts a game process for a single-player game. Step S37 is similar to step S22. After step S37, control proceeds to step S31 again.

Meanwhile, in step S38, the CPU 81 executes a game process. Step S38 is similar to step S23. After step S38, control proceeds to step S39.

In step S39, the CPU 81 determines whether or not its own terminal apparatus is a game management terminal. The determination in step S39 can be performed by determining whether or not a game management request has been received together with a game start request from the master terminal apparatus for the game for which a game process is being executed in step S38. If the determination result of step S39 is positive, control proceeds to step S40. Otherwise, control proceeds to step S31 again.

In step S40, the CPU 81 sends state notification information to the master terminal apparatus. That is, the CPU 81 sends information indicating a state of the game (e.g., the physical strength of a player character, points that have been acquired by the player character, and/or the remaining time of the game, etc.) obtained as a result of the game process in step S38, as the state notification information, the master terminal apparatus. When the CPU 81 desires to end the game for which a game process is being executed in step S38, the CPU 81 sends the state notification information containing information indicating that the game is to be ended, to the master terminal apparatus. After step S40, control proceeds to step S31 again.

(3-3. Changing of Master Terminal Apparatus)

Although not shown in FIGS. 24 and 25, during execution of the series of steps in a master terminal process or a slave terminal process, the CPU 81 ends the series of steps in response to an instruction to exit a lobby that is issued by a player. In this non-limiting example embodiment, a player can issue an instruction to exit a lobby in a situation where a lobby image is being displayed on the display 12. For example, a lobby image may contain a button image indicating an instruction to exit a lobby. The CPU 81 may end the series of steps in response to selection of the button image by a player.

It should be noted that, as described above, when the player of a master terminal apparatus exits a lobby, one of slave terminal apparatuses is set as a new master terminal apparatus. The master terminal apparatus sends lobby information and game state information stored in the storage section to other terminal apparatuses at a predetermined timing. As a result, these items of information are always synchronized between the terminal apparatuses of all participant players present in a lobby. When a master terminal apparatus exits a lobby, one of terminals is set as a new master terminal apparatus, and the new master terminal apparatus executes a master terminal process (FIG. 24), instead of a slave terminal process (FIG. 25) that has been being executed, based on the most recently obtained lobby information and game state information. As a result, the new master terminal apparatus receives information about the lobby from the master terminal apparatus that exits the lobby, and can manage the lobby. A similar process is performed when a master terminal apparatus is cut off the network. Furthermore, a similar process may be performed in a game management terminal so that a terminal apparatus newly servers as a game management terminal when the previous game management terminal exits a lobby or is cut off the network.

[4. Non-limiting Example Variations]

(4-1. Non-limiting Example Variation of Setting of Lobby)

In another non-limiting example embodiment, the server 10 may allow a player to designate a lobby that the player is to enter or a condition for entry into a lobby, and perform lobby matching-up based on the designated lobby or condition. In another non-limiting example embodiment, a terminal apparatus 1 may send, as the lobby entry request (step S4), a request for designation of a lobby that the player desires to enter or a request for designation of a condition for entry into a lobby that is desired by the player, to the server 10. For example, in step S4, an image indicating a list of lobbies set in the server 10 may be initially displayed on the terminal apparatus 1b. When a player selects a lobby that the player desires to enter, the terminal apparatus 1 may send a lobby entry request containing identification information of the selected lobby to the server 10.

Alternatively, for example, a terminal apparatus 1 may receive, from the player, an input indicating a condition for entry into a lobby that is desired by the player, and send a lobby entry request containing the input condition to the server 10. The condition may be, for example, related to another player (e.g., a player registered as a friend) registered in the terminal apparatus of a player. For example, a terminal apparatus 1 may display an image indicating a list on which other players are registered, and receive an instruction to designate one of the registered other players from the player. When the player performs inputting to designate another player, the terminal apparatus 1 may send a lobby entry request indicating the other player (i.e., a lobby entry request containing the player identification information of the designated other player) to the server 10. In this case, the server 10 causes the player of the terminal apparatus that has sent the lobby entry request, to enter the lobby in which the player indicated by the lobby entry request is present. It should be noted that when players are ranked (e.g., based on head-to-head results in a fighting game), the condition may be related to ranks.

Figure 26:
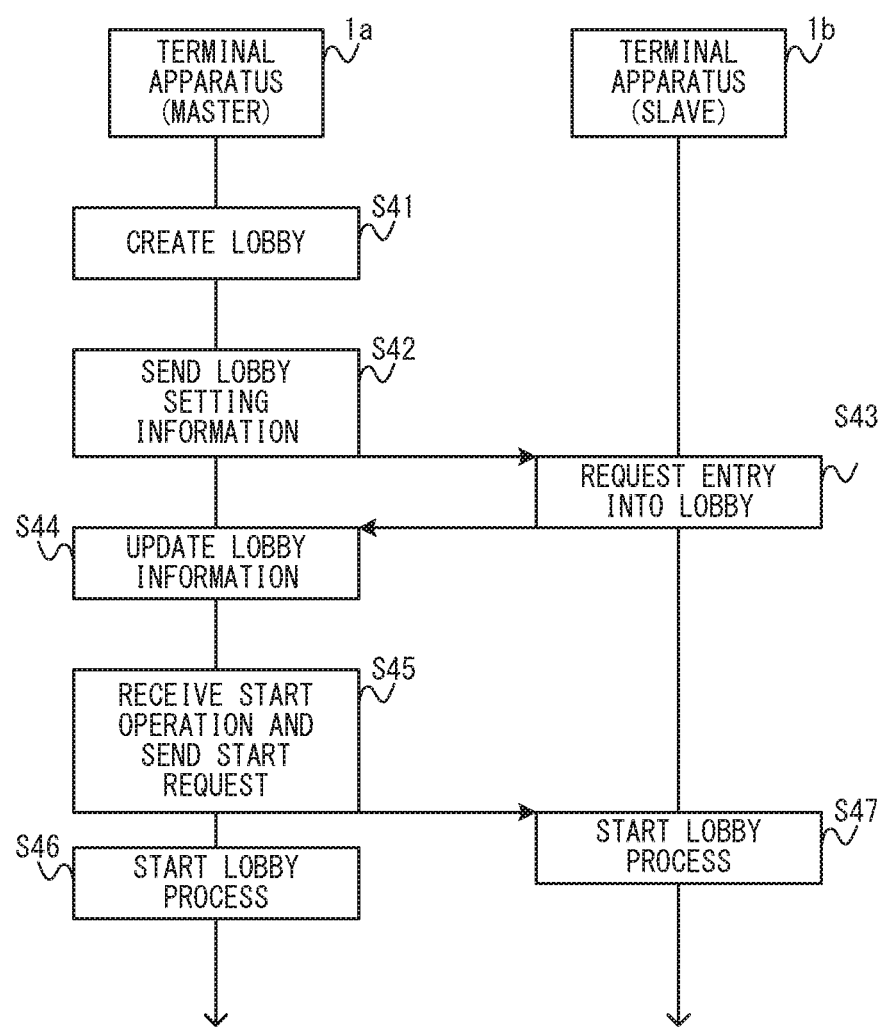
FIG. 26 is a diagram showing non-limiting example flows of a process of setting a lobby and a process of causing a player to enter the set lobby, in a non-limiting example variation of this non-limiting example embodiment.

In another non-limiting example embodiment, processes involved in setting of a lobby and entry into a lobby may be executed in a terminal apparatus instead of a server. FIG. 26 is a diagram showing non-limiting example flows of a process of setting a lobby and a process of causing a player to enter the set lobby, in a non-limiting example variation of this non-limiting example embodiment. It should be noted that, in the non-limiting example variation of FIG. 26, a lobby is set by communication between terminal apparatuses, and therefore, the game system may not include a server.

In the non-limiting example variation of FIG. 26, initially, the terminal apparatus 1a creates a lobby (step S41). That is, the terminal apparatus 1a generates and stores the above lobby information in a storage section. Here, it is assumed that the terminal apparatus 1a, which has set a lobby, is a master terminal apparatus.

After step S41, the master terminal apparatus 1a establishes communication with another terminal apparatus (slave terminal apparatus) 1b. In this non-limiting example variation, terminal apparatuses establish the above local communication therebetween. It should be noted that communication between terminal apparatuses is not limited to local communication, and may be established through the network 8. In this non-limiting example variation, the player of the slave terminal apparatus 1b establishes communication with the master terminal apparatus 1a by a predetermined operation before entering the lobby created by the master terminal apparatus 1a. It should be noted that communication between terminal apparatuses may be established by any suitable methods including conventional methods.

When communication with the slave terminal apparatus 1b has been established (in other words, a slave terminal apparatus has established communication with the master terminal apparatus 1a), the master terminal apparatus 1a sends lobby setting information to the slave terminal apparatus 1b (step S42). In this non-limiting example variation, the lobby setting information contains identification information of the created lobby, and player identification information of the player of the master terminal.

After receiving the lobby setting information from the master terminal apparatus 1a, the slave terminal apparatus 1b sends a lobby entry request to the master terminal apparatus 1a (step S43). For example, the slave terminal apparatus 1b displays information about the lobby (e.g., information about the player who has created the lobby) in response to reception of the lobby setting information, and allows the player to input an instruction to enter the lobby. The instruction to enter the lobby is performed, for example, by an operation of selecting an image indicating the lobby, or by inputting "yes" to an inquiry "do you enter the lobby?" When the player inputs an instruction to enter the lobby, the slave terminal apparatus 1b sends a lobby entry request to the master terminal apparatus 1a.

The master terminal apparatus 1a, when receiving the lobby entry request from the slave terminal apparatus 1b, updates the lobby information (step S44). That is, the lobby information is updated to contain information about the player involved with the lobby entry request. It should be noted that, in this case, if another slave terminal apparatus is already present in the lobby, the slave terminal apparatus that newly enters the lobby establishes communication with the slave terminal apparatus that is already present in the lobby, and locally communicates with that slave terminal apparatus after entering the lobby.

In this non-limiting example variation, each time communication is established between the master terminal apparatus 1a and a slave terminal apparatus 1b, steps S42-S44 are executed between the master terminal apparatus 1a and the slave terminal apparatus 1b. As a result, the players of slave terminal apparatuses 1b enter the lobby (in other words, the players are registered in the lobby information).

In this non-limiting example variation, after step S44, the master terminal apparatus 1a allows the player of the master terminal apparatus 1a to input an instruction to start a lobby process. When receiving the instruction, the master terminal apparatus 1a sends a start request to the slave terminal apparatus 1b (step S45). Thereafter, the master terminal apparatus 1a starts the lobby process (step S46). Meanwhile, the slave terminal apparatus 1b, when receiving the start request from the master terminal apparatus 1a, starts a lobby process (step S47). Thus, each terminal apparatus starts a lobby process, which is executed in a manner similar to that of the above non-limiting example embodiment.

As described above, in the above non-limiting example variation, a lobby process is started in response to an instruction issued by the player of the master terminal apparatus 1a. Here, in the above non-limiting example variation, alternatively, a lobby process may be started without a player's instruction (e.g., a lobby process may be started in response to entry of the player of a slave terminal apparatus into the lobby), as in the above non-limiting example embodiment. Furthermore, after the start of a lobby process, the master terminal apparatus 1a may also allow a new player to enter the lobby (by, steps S42-S44) in response to establishment of communication with a new slave terminal apparatus.

Alternatively, in the above non-limiting example embodiment, a lobby process may be started in response to an instruction issued by the player of the master terminal apparatus 1a, as in the above non-limiting example variation.

According to the above non-limiting example variation, for example, players who are registered as friends can enter a lobby together, or players who know each other (provided that local communication is performed between their terminal apparatuses) can enter a lobby together. In these cases, it is not necessary for a player to issue an instruction to enter a lobby each time a game is played once, as in the above non-limiting example embodiment. Therefore, a player's time and effort can be reduced when a game is repeatedly played.

In another non-limiting example embodiment, the game system may have, as functions for generating a lobby and allowing a player to enter or exit the lobby, the following three functions (or two of them): (a) a function of performing the lobby matching-up (i.e., a function of performing matching-up according to a lobby entry request without a condition) of the above non-limiting example embodiment; (b) a function of performing matching-up according to a lobby entry request with a condition in the above non-limiting example variation; and (c) a function of generating a lobby and allowing a player to enter or exit the lobby by local communication in the above non-limiting example variation.

In the above non-limiting example embodiment, the number of terminal apparatuses that are allowed to enter a lobby (the above lobby entry capacity) is fixed to a predetermined value (e.g., eight). Alternatively, in another non-limiting example embodiment, the server 10 may change the lobby entry capacity under a predetermined condition. The predetermined condition is, for example, that, in a non-limiting example embodiment in which a lobby entry request indicating another player is sent from a terminal apparatus to the server 10, "the number of terminal apparatuses in a lobby that a player indicated by a lobby entry request enters is a lobby entry capacity (i.e., a lobby entry capacity before being changed)." That is, even when the number of terminal apparatuses in a certain lobby has reached a lobby entry capacity before being changed, then if a lobby entry request indicates a player who is present in the lobby, the server 10 may change (i.e., increase) the lobby entry capacity, and allows a player who has sent the lobby entry request to enter the lobby. It should be noted that the lobby entry capacity may be increased up to a predetermined value (e.g., two). Accordingly, lobby matching-up can be performed in a manner more suitable for a player's desire.

(4-2. Non-limiting Example Variation of Game Selection Process)

In the above non-limiting example embodiment, a game that is to be played and players that are to participate therein are automatically selected in the game selection process. Here, in another non-limiting example embodiment, a condition that is used to automatically select a game and participant players may be set by a player. For example, a terminal apparatus may keep a game that has been previously designated by a player from being selected in the game selection process. Alternatively, for example, a terminal apparatus may execute the game selection process using a criterion designated by a player of a plurality of criteria (e.g., the criteria described concerning step S14). For example, as in the non-limiting example variation described in "(4-1. Non-limiting Example Variation of Setting of Lobby)," when players who are registered as friends can enter a lobby together, or players who know each other can enter a lobby together, a game may be performed in a lobby under a designated condition that is previously determined between players.

(4-3. Non-limiting Example Variation of Rule in Lobby)

In another non-limiting example embodiment, a terminal apparatus may execute a process based on the result of a game that has been played a plurality of times from a lobby. For example, a terminal apparatus may determine a winner player based on the result of a game that has been played a plurality of times. Specifically, a master terminal apparatus may give a participant player points based on the result of a game for each play of the game, and determine, as a winner, a player who has got a predetermined number of points first.

(4-4. Non-limiting Example Variation of Setting of Master Terminal Apparatus and Game Management Terminal)

In the above non-limiting example embodiment, a master terminal apparatus executes the game selection process (step S14), and in response to selection of a game by the game selection process, sets one of terminal apparatuses of selected participant players as a game management terminal (step S15). The terminal apparatus set as a game management terminal manages data that is used in a game process for a game selected by the game selection process. In this case, a terminal apparatus that performs the game selected by the game selection process executes a game process based on the data managed by the game management terminal. As a result, when a plurality of games are executed from a lobby, a processing load on the master terminal apparatus managing the lobby can be reduced.

Here, in another non-limiting example embodiment, when the above configuration is employed in which a master terminal apparatus and a game management terminal are set, a game and participant players may be selected in any suitable method in the game selection process. For example, a game and participant players may be selected and designated by a player. As in the above non-limiting example embodiment, a game management terminal may send state notification information to a master terminal apparatus. In this case, the master terminal apparatus may generate a lobby image based on the state notification information, or send information for generating a lobby image to a slave terminal apparatus.

(4-5. Non-limiting Example Variation of Processes in Server and Terminal Apparatus)

In another non-limiting example embodiment, a portion of the process executed in the server in the above non-limiting example embodiment and variations, may be executed in a terminal. In still another non-limiting example embodiment, a portion of the process executed by a terminal in the above non-limiting example embodiment and variations, may be executed in the server.

The above non-limiting example embodiment may be applied to, for example, a game system including terminal apparatuses, etc., for the purpose of reducing a waiting time imposed on a player when matching-up is performed for players, etc.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system including a plurality of terminal apparatuses configured to be operated by a plurality of players, the game system being further configured to connect to a network, the system comprising:
    at least one computer system including at least one computer processor, wherein the computer system is configured to:
        create a virtual lobby that allows up to a predetermined number of players to participate therein in response to a first request from one of the terminal apparatuses;
        in response to a second request from another one of the terminal apparatuses, designate as being virtually present in the lobby a player operating the another one of the terminal apparatuses that sent the second request;
        determine a game type, from a plurality of possible game types requiring different numbers of participant players, based on (a) the number of players who are present in the lobby and are not playing a multiplayer game and are ready to play, as well as (b) player states and/or game states related to games being played by the players;
        automatically select the game type based on the determination;
        automatically select participant players for the selected game type from the players ready to play; and
        perform a game process for the selected game type according to an operation performed by the selected participant players,
    wherein the terminals apparatuses are operable to provide single player games to the respective players when the respective players are designated as being virtually present in the lobby.

2. The game system according to claim 1, wherein the computer system is configured to, after an end of the game process for the selected game type, maintain the participant players as being present in the lobby, and set the participant players as being ready to play.

3. The game system according to claim 1, wherein the computer system is configured to generate a lobby image indicating a state of the lobby, at least when the participant players are ready to play.

4. The game system according to claim 3, wherein the lobby image contains at least information about the participant players in the game process for the selected game type, and information about a state of the game process for the selected game type.

5. The game system according to claim 3, wherein when the game process for the selected game type is being executed, the lobby image contains an image in which a game icon indicating the selected game type that is being played is associated with player icons indicating the participant players in the game process for the selected game type that is being played, and a player icon indicating readiness to play.

6. The game system according to claim 5, wherein at least one of the terminal apparatuses is a multiplayer terminal apparatus configured to be operated by multiple players associated therewith,
the computer system is configured to, when requested by one of the multiplayer terminal apparatuses, set each of the multiple players associated with the one of the multiplayer terminal apparatuses as being virtually present in the lobby, and
the computer system is configured to generate an image containing player icons each indicating a corresponding one of the multiple players associated with a single one of the multiplayer terminal apparatuses, the player icons being associated with each other.

7. The game system according to claim 5, wherein the computer system is configured to, after the selection of the game type and the participant players, generate an image containing a game icon indicating the selected game type, and player icons indicating the selected participant players, the game icon being associated with the player icons.

8. The game system according to claim 1, wherein at least one of the terminal apparatuses is a multiplayer terminal apparatus configured to be operated by multiple players associated therewith, and
the computer system is configured to, in response to being requested by one of the multiplayer terminal apparatuses, set each of the multiple players associated with the one of the multiplayer terminal apparatuses as being virtually present in the lobby.

9. The game system according to claim 1, further comprising:
a storage medium configured to store history information about a previously-played game that was played by the plurality of players when the plurality of players were present in the lobby,
wherein the computer system is configured to select the game type, in the automatic selection, based on the history information.

10. The game system according to claim 1, wherein the computer system is configured to determine whether the game process for the selected game type is nearly finished, based on states of the participant players in the game process for the selected game type and/or an elapsed time from a start of the game process, and
the computer system is configured to, when determining that the game process for the selected game type is nearly finished, not select a new game type until an end of the game process for the selected game type that has been determined to be nearly finished, and select a new game type after an end of the game process for the selected game type that has been determined to be nearly finished.

11. The game system according to claim 1, further comprising:
a storage medium configured to store player information that is group information indicating a group of players allowed to play games according to the possible game types, and indicates each of the players included in the group,
wherein the computer system is configured to update the player information so that the player information contains information about a player present in the lobby.

12. The game system according to claim 1, wherein at least one of the plurality of terminal apparatuses is a master terminal apparatus, and
a computer system included in the master terminal apparatus is configured to:
automatically select a game, and automatically select participant players in the selected game; and
in response to the selection of the game, set one of the terminal apparatuses operated by the selected participant players, as a game management terminal apparatus, and
a computer system included in the terminal apparatus set as the game management terminal apparatus is configured to manage data that is used in a game process for the selected game.

13. The game system according to claim 12, wherein:
the computer system included in the master terminal apparatus is configured to send information indicating a state of the lobby to a slave terminal apparatus of the plurality of terminal apparatuses, the slave terminal apparatus being different from the master terminal apparatus, and
a computer system included in the slave terminal apparatus is configured to generate a lobby image indicating the state of the lobby based on the information sent from the master terminal apparatus.

14. The game system according to claim 1, wherein the virtual lobby is at least initially managed by and/or for the one of the terminal apparatuses that issued the first request.

15. The game system according to claim 1, wherein the plurality of possible game types belong to a predefined game group.

16. The game system according to claim 15, wherein the game types in the predefined game group represent different categories of games.

17. The game system according to claim 1, wherein the plurality of possible game types include at least competitive and cooperative game types.

18. The game system according to claim 1, wherein the plurality of possible game types include different modes of the same game.

19. The game system according to claim 1, wherein possible game states include indications of whether the respective games are nearly finished.

20. The game system according to claim 1, wherein possible player states include indications of whether multiple players are grouped together for gameplay.

21. The game system according to claim 1, wherein possible player states include indications of what game is being played.

22. A game processing method executable in a game system including a plurality of terminal apparatuses configured to be operated by a plurality of players, and connect to a network, the method comprising, in connection with the game system:
creating a virtual lobby that allows up to a predetermined number of players to participate therein in response to a first request from one of the terminal apparatuses;
in response to a second request from another one of the terminal apparatuses designating as being virtually present in the lobby a player operating the another one of the terminal apparatuses that sent the second request;
determining a game type, from a plurality of possible game types requiring different numbers of participant players, based on (a) the number of players who are present in the lobby and are not playing a multiplayer game and are ready to play, as well as (b) player states and/or game states related to games being played by the players;

automatically selecting the game type based on the determination;

automatically selecting participant players for the selected game type from the players ready to play; and performing a game process for the selected game type according to an operation performed by the selected participant players, wherein the terminals apparatuses are operable to provide single player games to the respective players when the respective players are designated as being virtually present in the lobby.

23. The game processing method according to claim 22, wherein the game system, after an end of the game process for the selected game performed by the game process, maintains the participant players present in the lobby, and sets the participant players as being ready to play.

24. The game processing method according to claim 22, wherein at least one of the terminal apparatuses is a multiplayer terminal apparatus configured to be operated by multiple players associated therewith, and the game system, in response to being requested by one of the multiplayer terminal apparatuses, sets each of the multiple players associated with the one of the multiplayer terminal apparatuses as being virtually present in the lobby.

25. The game processing method according to claim 22, wherein the game system is configured to store history information about a previously-played game that was played by the plurality of players when the plurality of players were present in the lobby, and the game system selects the game type, in the automatic selection, based on the history information.

26. The game processing method according to claim 22, wherein the game system determines whether the game process for the selected game type is nearly finished, based on states of the participant players in the game process for the selected game type and/or an elapsed time from a start of the game process, and the game system, when determining that the game process for the selected game type is nearly finished, does not select a new game type until an end of the game process for the selected game type that has been determined to be nearly finished, and selects a new game type after an end of the game process for the selected game type that has been determined to be nearly finished.

27. The game processing method according to claim 22, wherein the game system stores player information that is group information indicating a group of players allowed to play games according to the possible game types, and indicates each of the players included in the group, and the game system updates the player information so that the player information contains information about a player present in the lobby.

28. The game processing method according to claim 22, wherein at least one of the plurality of terminal apparatuses is a master terminal apparatus, and the master terminal apparatus is configured to:

automatically select a game, and automatically select participant players for the selected game; and in response to the selection of the game, set one of the terminal apparatuses operated by the selected participant players, as a game management terminal apparatus, and the terminal apparatus set as the game management terminal apparatus is configured to manage data that is used in a game process for the selected game.

29. An information processing apparatus configured to be operated by at least one player, and communicate with an information processing apparatus of another player, the apparatus comprising:

a computer system including at least one computer processor, wherein the computer system is configured to:

cause a virtual lobby that allows up to a predetermined number of players to participate therein to be created in response to a first request from the information processing apparatus;

determine a game type, from a plurality of possible game types requiring different numbers of participant players, based on (a) the number of players who are present in the lobby and are not playing a multiplayer game and are ready to play, as well as (b) player states and/or game states related to games being played by the players;

automatically select the game type based on the determination;

automatically select participant players for the selected game type from the players ready to play; and perform a game process for the selected game type according to an operation performed by the selected participant players, wherein the apparatuses are operable to provide single player games to the respective players when the respective players are designated as being virtually present in the lobby.

30. The information processing apparatus according to claim 29, further comprising:

a storage medium configured to store player information that is group information indicating a group of players allowed to play games according to the possible game types, and indicates each of the players included in the group, and the computer system is configured to update the player information so that the player information contains information about a player present in the lobby.

31. The information processing apparatus according to claim 29, wherein the computer system is configured to, in response to the selection of the game type, set one of the terminal apparatuses operated by the selected participant players, as a game management terminal apparatus, and the terminal apparatus set as the game management terminal apparatus is configured to manage data that is used in the game process for the selected game type.

32. A non-transitory computer-readable storage medium having stored therein an information processing program executable by a computer system in an information processing apparatus that is configured to be operated by at least one player, and communicate with an information processing apparatus of another player, the information processing program, when executed, causing the computer system to perform functionality comprising:

causing a virtual lobby that allows up to a predetermined number of players to participate therein to be created in response to a first request from the information processing apparatus;

determining a game type, from a plurality of possible game types requiring different numbers of participant players, based on (a) the number of players who are present in the lobby and are not playing a multiplayer game and are ready to play, as well as (b) player states and/or game states related to games being played by the players;

automatically selecting the game type based on the determination;

automatically selecting participant players for the selected game type from the players ready to play; and performing a game process for the selected game type according to an operation performed by the selected participant players, wherein the apparatuses are operable to provide single player games to the respective players when the respective players are designated as being virtually present in the lobby.

33. The storage medium according to claim 32, wherein the storage medium is configured to store player information that is group information indicating a group of players allowed to games according to the possible game types, and indicates each of the players included in the group, and the information processing program, when executed, is configured to cause the computer system to further execute updating the player information so that the player information contains information about a player present in the lobby.

34. The storage medium according to claim 32, wherein the information processing program, when executed, is configured to cause the computer system to further execute, in response to the selection of the game type, setting one of the terminal apparatuses operated by the selected participant players, as a game management terminal apparatus, and the terminal apparatus set as the game management terminal apparatus is configured to manage data that is used in the game process for the selected game.

* * * * *